(12) United States Patent
Amano et al.

(10) Patent No.: US 6,689,196 B2
(45) Date of Patent: Feb. 10, 2004

(54) FUEL VAPOR CONTROL APPARATUS

(75) Inventors: Noriyasu Amano, Gamagori (JP); Hideaki Itakura, Okazaki (JP); Masaki Takeyama, Okazaki (JP); Naoya Kato, Ama-gun (JP); Nobuhiko Koyama, Nagoya (JP)

(73) Assignees: Nippon Soken Inc., Nishio (JP); Denso Corporation, Kariya (JP)

( * ) Notice: Subject to any disclaimer, the term of this patent is extended or adjusted under 35 U.S.C. 154(b) by 36 days.

(21) Appl. No.: 10/120,519

(22) Filed: Apr. 12, 2002

(65) Prior Publication Data

US 2002/0148354 A1 Oct. 17, 2002

(30) Foreign Application Priority Data

Apr. 13, 2001 (JP) ........................................ 2001-115821

(51) Int. Cl.[7] ............................. B01D 53/04; F02M 25/08
(52) U.S. Cl. ............................. 96/112; 96/113; 96/114; 96/126; 96/130; 96/146; 123/519
(58) Field of Search .................... 96/108, 111, 112, 96/113, 114, 121, 126, 130, 143, 146, 147; 95/11, 15, 115; 123/518–521

(56) References Cited

U.S. PATENT DOCUMENTS

| | | | | |
|---|---|---|---|---|
| 3,926,168 A | * | 12/1975 | Csicsery | 123/179.7 |
| 4,829,968 A | * | 5/1989 | Onufer | 123/518 |
| 4,919,103 A | | 4/1990 | Ishiguro et al. | |
| 5,021,071 A | * | 6/1991 | Reddy | 95/106 |
| 5,474,047 A | * | 12/1995 | Cochard et al. | 123/491 |
| 5,794,599 A | * | 8/1998 | Blumenstock | 123/519 |
| 5,861,050 A | * | 1/1999 | Pittel et al. | 95/115 |
| 6,098,601 A | * | 8/2000 | Reddy | 123/520 |
| 6,230,693 B1 | * | 5/2001 | Meiller et al. | 123/519 |
| 6,279,548 B1 | * | 8/2001 | Reddy | 123/520 |
| 6,321,727 B1 | * | 11/2001 | Reddy et al. | 123/520 |

FOREIGN PATENT DOCUMENTS

| | | | |
|---|---|---|---|
| JP | 55-119419 | | 9/1980 |
| JP | 58-144051 | | 9/1983 |
| JP | 58-220951 A | * | 12/1983 |
| JP | 60-6061 | | 1/1985 |
| JP | 60-27813 | | 8/1985 |
| JP | 61-136164 | | 8/1986 |
| JP | 2-13161 | | 1/1990 |
| JP | 2-50160 | | 4/1990 |
| JP | 5-21158 | | 3/1993 |
| JP | 8-42413 | | 2/1996 |
| JP | 2001-182632 | | 7/2001 |

* cited by examiner

Primary Examiner—Frank M. Lawrence
(74) Attorney, Agent, or Firm—Nixon & Vanderhye, P.C.

(57) ABSTRACT

A fuel adsorption layer formed in a canister is partitioned into an upper adsorption layer and a lower adsorption layer by a partition plate in which a heater is embedded. The relation between a heating value of the heater and thickness X of the upper and lower adsorption layers is set so that the temperature of a part closest to the heater heating face of the fuel adsorption layer is lower than a fire point of the fuel, and the temperature of a part farthest from the heater heating face is higher than the boiling point of the fuel. With the configuration, by heating the fuel adsorption layer by the heater, the desorption performance of activated carbon is improved, and almost all of the fuel vapors adsorbed can be desorbed.

13 Claims, 14 Drawing Sheets

| FUEL SAMPLE | RVP | BOILING POINT |
|---|---|---|
| REGULAR GASOLIN (JAPAN) A | 72kPa | 50°C |
| REGULAR GASOLIN (JAPAN) B | 64kPa | 53°C |
| REGULAR GASOLIN (JAPAN) C | 75kPa | 48°C |
| TEST GASOLIN IN EPA (USA) D | 62kPa | 54°C |
| TEST GASOLIN IN CARB (USA) E | 48kPa | 62°C |

FUEL VAPOR CONTROL APPARATUS

CROSS REFERENCE TO RELATED APPLICATION

This application is based on Japanese Patent Applications No. 2001-115821 filed on Apr. 13, 2001, No. 2000-312073 filed on Oct. 12, 2000, and No. 11-292499 filed on Oct. 14, 1999 the contents of which are incorporated herein by reference.

BACKGROUND OF THE INVENTION

1. Field of the Invention

The present invention relates to a fuel vapor control apparatus having a canister for adsorbing fuel vapors released from a fuel tank.

2. Related Art

A fuel vapor control apparatus is used to adsorb and store fuel vapors evaporated from a fuel tank so as not to be released to the outside of a vehicle during travel of the vehicle or when the vehicle is stopped, and has a canister filled with activated carbon as an adsorbent. The fuel vapor adsorbed by the canister is desorbed and led to an intake pipe by drawing outside air from an atmosphere port of the canister by a negative pressure of an intake pipe when the engine operates, and the fuel vapor is burned along with a fuel injected by an injector.

In recent years, control on release of the fuel vapor to atmosphere is becoming rigorous. For example, in ORVR control of U.S.A. it is requested to capture all of fuel vapors from a fuel tank exhausted during refueling by a canister, not to be released to the atmosphere. Consequently, a large amount of fuel vapors has to be treated by a canister, and a canister having higher performance is demanded. The adsorption/desorption performance of activated carbon is largely influenced by temperature. The lower the temperature is, the more the adsorption amount increases. The higher the temperature is, the more the desorption amount increases. However, in the canister, the temperature changes so as to increase at the time of adsorption and so as to decrease at the time of desorption. There is consequently a problem such that the performance of activated carbon is not fully displayed. For example, in the case where the activated carbon adsorbs the fuel vapors, a capillary condensation phenomenon occurs in fine pores of the activated carbon, and the fuel vapors as gases are liquefied and adsorbed. In this case, together with the phase change from gases to liquid, adsorption heat (condensation latent heat) is generated, and the temperature increases. On the other hand, in the case where the liquefied fuel vapors are desorbed, the fuel adsorbed by purging becomes gases from the liquid while taking heat of evaporation from the surrounding, so that the temperature decreases due to the heat absorption.

In the conventional canister, due to the phenomenon, the temperature in the canister becomes higher than the ambient temperature by tens degrees at the time of adsorption. On the other hand, at the time of desorption, the temperature in the canister drops and may become equal to or below 0° C. Particularly, at the time of desorption, a part in which the activated carbon temperature decreases due to the heat absorption reaction does not easily desorb the fuel vapors due to decrease in temperature. If the fuel vapors adsorbed cannot be completely desorbed, there is the possibility that, while the vehicle is parked, the fuel vapors diffuse in the canister and leak from the atmosphere port.

JP-A-8-42413, JP-A-60-6061, and JP-A-64-347 and Japanese Unexamined Utility Model Application JP-U-60-27813, JP-U-2-13161, JP-U-5-21158, and JP-U-58-144051 disclose a technique of heating activated carbon in a canister by heating means. The conventional techniques have, however, a problem such that activated carbon cannot be uniformly heated or a problem such that the size of the canister increases. On the other hand, the fuel vapors released from the canister are burned in an internal combustion engine. Consequently, fluctuations in density of fuel vapors or fuel vapor amount may cause poor combustion or deterioration in exhaust emission.

SUMMARY OF THE INVENTION

An object of the invention is to provide a fuel vapor control apparatus with improved performance of desorbing/adsorbing fuel vapors without increasing the capacity of a canister.

Another object of the invention is to provide a fuel vapor control apparatus capable of obtaining desired temperature in the whole area of a fuel adsorption layer in a canister.

Further another object of the invention is to provide a fuel vapor control apparatus in which an amount of heat of heating and the shape of a fuel adsorption layer are set so as to obtain desired temperature in the whole area of a fuel adsorption layer in a canister.

Further another object of the invention is to provide a fuel vapor control apparatus capable of preventing deterioration in combustion state or exhaust emission.

According to a first feature of the present invention, temperature of a fuel adsorption layer is derived by an equation expressing an amount of heat given to an adsorbent by temperature control means and a distance from the temperature control means. The amount of heat given to the adsorbent by the temperature control means and the shape of the fuel adsorption layer (distance to a part which is the farthest from the temperature control means of the fuel adsorption layer) are set so that the temperature is higher than the boiling point of the fuel and lower than the fire point of the fuel in the whole area of the fuel adsorption layer.

Concretely, when an amount of heat given to the adsorbent by the temperature control means for controlling the temperature of the fuel adsorption layer is Q(W), a distance from the temperature control means to a farthest part which is the farthest from the temperature control means of the fuel adsorption layer is X(m), and temperature of the fuel adsorption layer is T(K), the amount Q of heat and the distance X are specified by the following relational expression (1)

$$T = -355 Q \times X^2 - 815X + Q + 298 \tag{1}$$

so that the temperature T satisfies the following condition (2) in the whole area of the fuel adsorption layer.

$$\text{boiling point of fuel} \leq T < \text{fire point of fuel} \tag{2}$$

The relation between the temperature of the fuel and the evaporation amount is that after the temperature of the fuel exceeds the boiling point, the evaporation amount sharply increases (When the temperature of the fuel becomes equal to or higher than the boiling point, the fuel is vaporized very easily). Consequently, by setting the temperature of the fuel adsorption layer to be higher than the boiling point of the fuel, the fuel vapors liquefied and adsorbed by the adsorbent are easily vaporized and very easily desorbed. Therefore, when the amount Q of heat given to the adsorbent by the temperature control means and the shape of the fuel adsorption layer (the distance from the temperature control means to the farthest part of the fuel adsorption layer) are designed in accordance with the equation (1) so that the temperature T of the fuel adsorption layer is higher than the boiling point of the fuel, the temperature of the whole area of the fuel adsorption layer can be sufficiently controlled.

When the temperature of the fuel adsorption layer is increased too much and exceeds the fire point of the fuel, it is not desirable from the viewpoint of safety. The temperature T of the fuel adsorption layer has to be set lower than the fire point of the fuel. Consequently, by setting the amount of heat given to the adsorbent by the temperature control means and the shape of the fuel adsorption layer (the distance from the temperature control means to the farthest part of the fuel adsorption layer) so that the temperature T in the whole area of the fuel adsorption layer satisfies the condition (2), specifically, the temperature in the portion closest to the temperature control means of the fuel adsorption layer is lower than the fire point of the fuel and the temperature in the portion farthest from the temperature control means of the fuel adsorption layer is higher than the boiling point of the fuel, a canister having high desorption performance can be obtained.

The heat gradient of the canister satisfying the condition at the time of adsorption is opposite to that at the time of desorption, and the adsorption heat generated at the time of adsorption can be effectively released to the outside, so that an increase in temperature at the time of adsorption is suppressed. The canister has therefore an additional value of increased adsorption performance. Consequently, the increase in temperature at the time of adsorption is suppressed and an amount of fuel vapors which can be adsorbed increases, thereby enabling the adsorption performance to be improved without increasing the capacity of the canister. Further, since the fuel vapors do not remain in the fuel adsorption layer, the adsorbent does not easily deteriorate, and the adsorbent amount conventionally increased in consideration of the deterioration amount (by about 20%) can be decreased. Thus, the smaller size of the canister can be realized.

When the boiling point of the fuel is 318K (45° C.) and the fire point of the fuel is 473K (200° C.), the amount Q of heat and the distance X may be specified so that the temperature T satisfies the condition (2) in the whole area of the fuel adsorption layer.

Specifically, since the boiling points of general fuels are about 45 to 60° C., and the fire point of a component having the lowest fire point included in the general fuel is a little higher than 200° C., by setting the amount of heat given to the adsorbent by the temperature control means and the shape of the fuel adsorption layer (the distance from the temperature control means to the farthest part of the fuel adsorption layer) so that the temperature T lies in a range of 45° C.$\leq$T<200° C. in the condition (2), the temperature of the whole area of the fuel adsorption layer can be efficiently controlled, and a canister having high desorption performance can be obtained.

The temperature control means for controlling temperature of the fuel adsorption layer may be disposed in parallel with the flow of the fuel vapors, and the fuel adsorption layer is disposed so that the whole area of the fuel adsorption layer is positioned within 25 mm from the temperature control means.

The temperature control means may be provided along a wall face of at least one of the casing wall which is in contact with the fuel adsorption layer and a partition wall for partitioning the fuel adsorption layer. Concretely, when the temperature control means is disposed along the casing wall or the partition wall, the flow of fuel vapors is not disturbed, and fabrication and assembly are easy.

The fuel adsorption layer may be partitioned so that each of partitioned parts has a flat section shape. By forming each of the adsorption layer in a flat shape with a reduced thickness, the whole area is subjected to the temperature control of the temperature control means, so that the efficiency of heat transfer can be increased.

A cross section perpendicular to the flow of the fuel vapors of the fuel adsorption layer may have an almost rectangular shape, and a partition wall for partitioning the fuel adsorption layer into a plurality of adsorption layers may be disposed in parallel with a wall face of the casing which is in contact with a long side of the rectangular shape. For example, when the partition wall is provided so as to equally divide each of short sides of the rectangle into two parts, two adsorption layers each having a flat rectangular cross section are formed, and the temperature of the whole adsorbent can be controlled with a simple configuration without finely partitioning the fuel adsorption layer.

The temperature control means may be provided integrally with a partition wall for partitioning the adsorption layer into a plurality of adsorption layers. Alternately, the temperature control means may be provided integrally with a wall of the casing for housing the fuel adsorption layer. Concretely, when the temperature control means is provided integrally with the partition wall or the casing call, the configuration becomes simpler. By controlling the temperature from the whole wall face, the efficiency of heat transfer is improved.

The temperature control means may be a heater plate for heating the adsorbent, and the heater plate may be obtained by embedding a heating element in the partition wall or the casing wall. In this case, by passing a current to the heater plate at the time of desorption to heat the adsorbent, temperature drop in associated with vaporization of fuel vapors is suppressed, and the desorption performance can be improved. Since the partition wall or casing wall itself is constructed by the heater plate as the temperature control means, the efficiency of heat transfer is high. Since the heating element is not in direct contact with the adsorbent, excellent safety is achieved.

The temperature control means may be a temperature control layer comprising a pass provided in the partition wall or the casing wall, and a medium which flows in the pass to heat or cool the adsorbent. For example, by passing the medium for heating through the vapor path at the time of desorption and passing the medium for cooling at the time of adsorption, more effective temperature control can be performed. Thus, the performance of the canister is largely improved.

By disposing the temperature control layer and the plurality of adsorbent layers alternately or in a lattice state, the temperature of the adsorbent layer is controlled from a plurality of faces, so that the efficiency of heat transfer can be increased.

According to another feature of the invention, in a fuel vapor control apparatus comprising a canister in which a fuel adsorption layer is formed by filling a casing with an adsorbent, one end of the canister being communicated with a fuel vapor path extending to a fuel tank and a purge path extending to an intake path of an internal combustion engine, and the other end of the canister being communicated with atmosphere, for temporarily adsorbing and storing fuel vapors released from the fuel tank into the fuel vapor path by the fuel adsorption layer, when the internal combustion engine operates, desorbing the fuel vapors, and transmitting the fuel vapors via the purge path into the intake path, a cross section perpendicular to the flow of the fuel vapors of the fuel adsorption layer is formed in a flat, almost rectangular shape, and temperature control means for controlling temperature of the adsorbent is disposed along the casing wall face which is in contact with a long side of the rectangular shape.

The fuel adsorption layer is not partitioned but is formed so as to have a section of a flat, almost rectangular shape having high efficiency of heat transfer, and the temperature control means is disposed along the face of the large area, thereby enabling the whole adsorbent to be heated or cooled with reliability. With the configuration as well, a small, high-performance fuel vapor control apparatus with improved adsorption/desorption performance can be obtained.

According to further another feature of the invention, in a fuel vapor control apparatus having temperature control means for controlling the temperature of an adsorbent as any of the above-described fuel vapor control apparatus, control means is provided for calculating a purge fuel amount on the basis of opening of a purge valve provided for the purge path and a detection result of an HC concentration sensor, and controlling the opening of the purge valve and operation of the temperature control means so that the purge fuel amount lies in a predetermined range.

The control means calculates an amount of purge fuel which flows into the intake pipe on the basis of purge flow rate known from the opening of the purge valve and fuel vapor concentration detected by the HC concentration sensor, and controls the opening of the purge valve so that the purge fuel amount lies in a predetermined range. When a predetermined purge fuel amount cannot be obtained by the opening of the purge valve, the operation of the temperature control means is started to promote or suppress desorption, thereby enabling the amount of fuel vapors flowing into the intake pipe to be controlled to be within the predetermined range. Thus, fluctuation in air-fuel ratio can be prevented and poor combustion and deterioration in exhaust emission can be prevented.

The temperature control means may be heating means for heating the adsorbent, and the control means may stop operation of the temperature control means when an amount of remaining fuel in the fuel tank becomes equal to or smaller than a predetermined value.

When the temperature control means is the heating means for heating the adsorbent, if the canister is in a heated state at the time of feeding fuel, the adsorption performance deteriorates. Consequently, when it is determined that the amount of remaining fuel in the fuel tank is smaller than a predetermined value, the heating of the temperature control means is stopped to prevent deterioration in adsorption performance. By setting the predetermined value to a value which is a little larger than the remaining amount at which the feeding of fuel is usually necessary, the canister temperature is low at the time of fuel feeding, so that the adsorption performance can be sufficiently displayed. In the case where the fuel remaining amount is larger than the predetermined amount and fuel is fed during the temperature control means operates, there is a case such that the time since the operation stop until the fuel feeding is short, and the temperature does not decrease sufficiently. In this case, however, the amount of fuel (that is, fuel vapor amount to be generated) is relatively small, and no fuel vapors remain in the canister because of the improved desorption performance, so that all of fuel vapors generated can be adsorbed.

The control means may stop operation of the temperature control means when the HC concentration detected by the HC concentration sensor or a fuel tank internal pressure becomes equal to or lower than a predetermined value.

When the HC concentration detected by the HC concentration sensor decreases to the predetermined value or lower, it is determined that the amount of fuel vapors adsorbed in the canister is small, and the operation of the temperature control means is stopped. Also in the case where the internal pressure of the fuel tank becomes equal to or lower than the predetermined value, it is determined that the fuel vapors do not flow in the canister. By stopping the operation of the temperature control means, the cost can be reduced by reducing power consumption and the like.

It is also possible to pressurize a closed space by heating the temperature control means, the closed space being formed in a path of fuel vapors extending from the fuel tank to the intake path via the canister when a purge valve provided for the purge path is closed, and determine a leak in the closed space in accordance with whether or not a pressure in the closed space detected by pressure detecting means reaches a predetermined pressure within a predetermined time. In this case, if the pressure reaches the predetermined pressure within the predetermined time, it is determined that there is no leak in the closed space. If the pressure does not reach the predetermined pressure, it is determined that there is a leak. Thus, the presence or absence of a leak can be easily determined without requiring a special configuration for diagnosis.

The closed space may be pressurized to a predetermined pressure by being heated by the temperature control means, after that, the heating is interrupted, and a leak in the closed space may be determined from a pressure drop state of the closed space detected by the pressure detecting means.

After pressuring the closed space to the predetermined pressure, the heating is interrupted, and the pressure drop state is monitored. With the configuration, not only the presence or absence of a leak but also the diameter of the leak hole, and the like can be known, and more accurate determination can be carried out.

DETAILED DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Embodiments of the invention will be described with reference to the drawings.

First Embodiment

Figure 1:
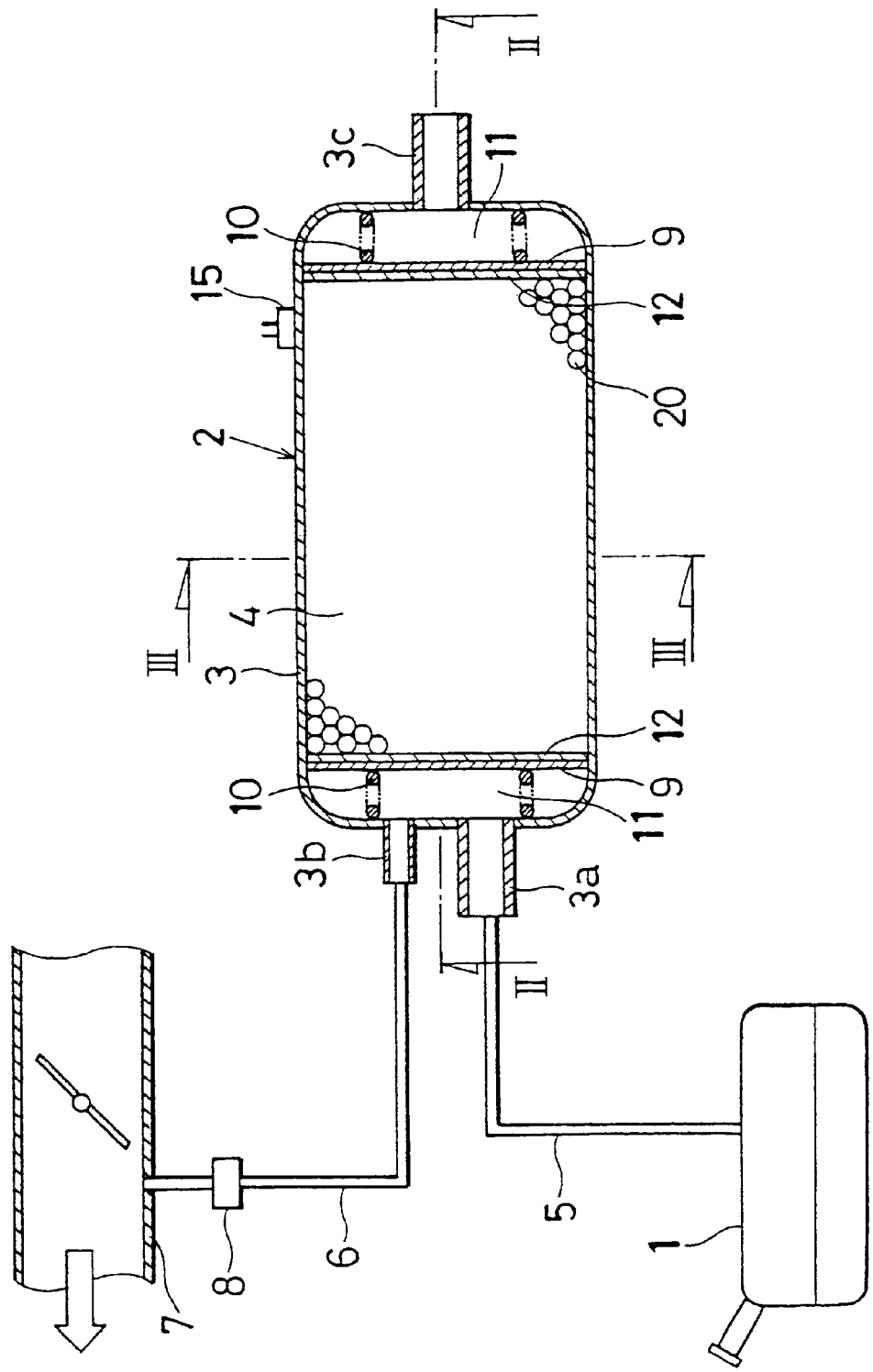
FIG. 1 is a configuration diagram showing the system of a fuel vapor control apparatus according to a first embodiment of the invention.

FIG. 1 is a configuration diagram showing the system of a fuel vapor control apparatus. The fuel vapor control apparatus of the embodiment has a canister 2 for temporarily adsorbing and storing fuel vapors generated in a fuel tank 1. In the canister 2, a casing 3 is filled with activated carbon 20 (adsorbent). By the filled activated carbon 20, a fuel adsorption layer 4 (4A, 4B) is formed.

The casing 3 is made of, for example, a resin and has an almost rectangular parallelepiped shape. An evaporation port 3a and a purge port 3b are provided in parallel on one end face in the longitudinal direction (lateral direction of FIG. 1) of the casing 3, and an atmosphere port 3c is provided on the other end face. The evaporation port 3a is connected to the fuel tank 1 via an evaporation line 5, and the purge port 3b is connected to an intake pipe 7 of the engine via a purge line 6. In some midpoint of the purge line 6, a purge valve 8 for adjusting a purge flow rage (flow rate of fuel vapors taken into the intake pike 7 from the canister 2) is provided. The atmosphere port 3c is opened to the atmosphere.

In the casing 3, porous plates 9 are disposed on both sides in the longitudinal direction of the fuel adsorption layer 4 and pressed by springs 10 disposed between the porous plates 9 and the end faces of the casing 3, thereby sandwiching and holding the fuel adsorption layer 4. Therefore, a space 11 is assured between each of the end faces of the casing 3 and each of the porous plates 9, so that the fuel vapor or atmosphere is uniformly distributed to the fuel adsorption layer 4.

Figure 2:
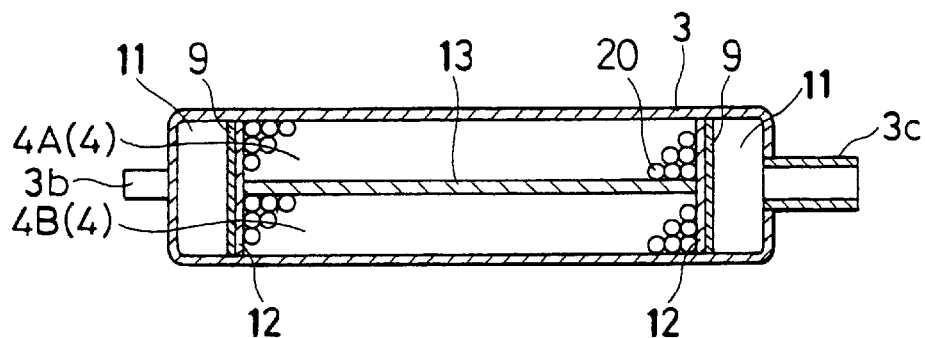
FIG. 2 is a longitudinal cross section of a canister, taken along line II—II of FIG. 1.
Figure 3:
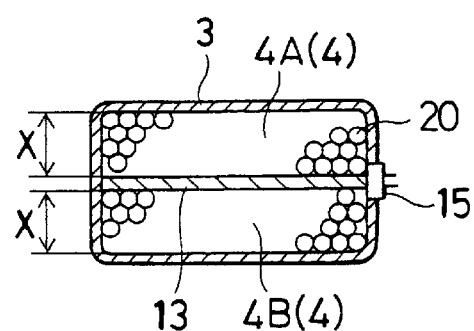
FIG. 3 is a transverse cross section of the canister, taken along line III—III of FIG. 1.
Figure 4:
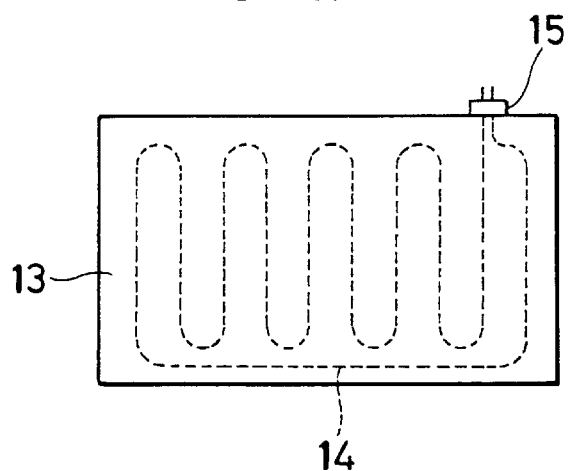
FIG. 4 is plan view of a partition plate.

A filter 12 is disposed between each of the porous plates 9 and the fuel adsorption layer 4, thereby preventing the activated carbon 20 from being fallen out. The fuel adsorption layer 4 is, as shown in FIGS. 2 and 3, partitioned into an upper adsorption layer 4A and a lower adsorption layer 4B by a partition plate 13 disposed on the inside. The partition plate 13 is disposed in a position so as to divide the fuel adsorption layer 4 almost into two portions in the thickness direction so that the upper and lower adsorption layers 4A and 4B have equal thickness (dimension in the vertical direction of FIG. 2). In the partition plate 13, as shown in FIG. 4, a heater 14 (temperature control means) is embedded.

The heater 14 is embedded almost in the whole face of the partition plate 13, and is connected to an external power source via a connector 15 attached to the outside of the casing 3.

The relation between the heating value of the heater 14 and the thickness (X in FIG. 3) in the vertical direction of the upper and lower adsorption layers 4A and 4B facing the heater heating face will now be described.

Generally, heat conduction in the case where heat is generated internally in a stationary state (a state where the temperature does not change with time) is expressed by the following equation of heat conduction.

$$\partial^2 T/\partial X^2 + Q'/\lambda = 0$$

where T is temperature (K) of the fuel adsorption layer, X is distance (m) from the heating face, Q' is a heating value (W) per unit area, and λ is heat conduction of the fuel adsorption layer (0.2 W/mK in the case of the activated carbon 20).

Figure 5:
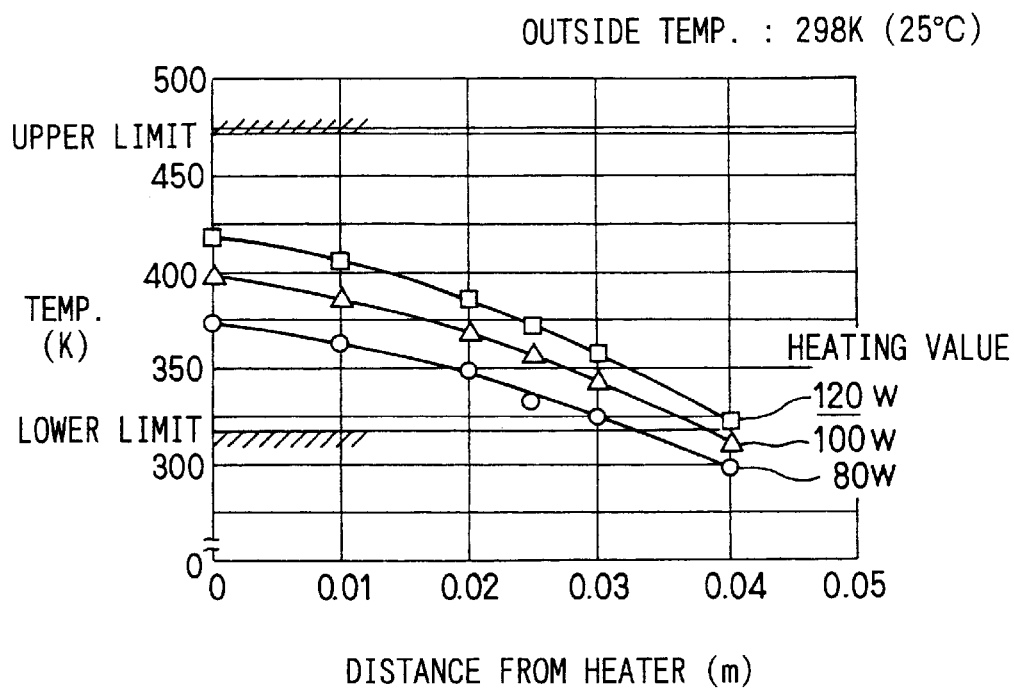
FIG. 5 is a measurement graph showing temperature of a fuel adsorption layer measured by using a heating value of a heater and distance from the heater as parameters.

In the canister 2 of the embodiment, when the temperature of the fuel adsorption layer 4 is measured in a stationary state by using, as parameters, the heating value of the heater 14 and the distance from the heater heating face, as shown in FIG. 5, the temperature of the fuel adsorption layer 4 decreases with distance from the heater 14. The larger the heating value of the heater 14 is, the higher the temperature of the fuel adsorption layer 4 becomes.

When an empirical formula is computed by substituting the data of FIG. 5 for the equation of heat conduction, the relation of the temperature T(K) of the fuel adsorption layer 4, distance X(m) from the heater 14, and the heating value Q(W) of the heater 14 is expressed by the following equation.

$$T = -355Q \times X^2 - 815X + Q + 298 \qquad (1)$$

Figure 6:
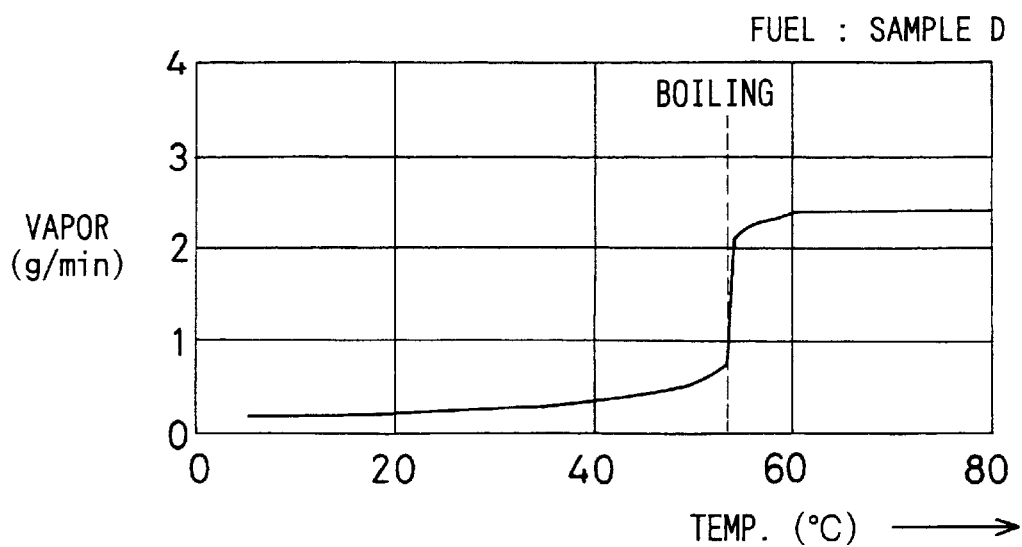
FIG. 6 is a graph showing the relation between the temperature of a fuel and a vapor generation amount.

The relation between the temperature of a fuel and the vapor amount is as shown in FIG. 6. It is understood that after the temperature of the fuel exceeds the boiling point, the vapor amount sharply increases. When the temperature of the fuel becomes equal to or higher than the boiling point, the fuel is vaporized very easily. Consequently, by setting the temperature of the fuel adsorption layer 4 to be higher than the boiling point of the fuel, the fuel vapors liquefied and adsorbed by the activated carbon 20 are easily vaporized and very easily desorbed. Therefore, when the heating value of the heater 14 and the distance from the heater 14 to the farthest part of the fuel adsorption layer 4 are set so that the temperature T of the adsorption layer 4 is higher than the boiling point of the fuel, the temperature of the whole area of the fuel adsorption layer 4 can be sufficiently controlled.

However, since the temperature of the fuel adsorption layer 4 cannot exceed the fire point of the fuel, the temperature T of the fuel adsorption layer 4 has to be set lower than the fire point of the fuel. Consequently, the temperature T of the fuel adsorption layer 4 is requested to satisfy the following condition (2) in the whole area of the fuel adsorption layer 4.

$$\text{Boiling point of fuel} \leq T < \text{fire point of fuel} \quad (2)$$

That is, by setting the heating value Q of the heater 14 and the distance X from the heater 14 to the farthest part of the fuel adsorption layer 4 (upper and lower adsorption layers 4A and 4B) so that the temperature in the portion closest to the heater heating face of the fuel adsorption layer 4 is lower than the fire point of the fuel and the temperature in the portion farthest from the heater heating face of the fuel adsorption layer 4 is higher than the boiling point of the fuel, the canister 2 having high desorption performance can be obtained.

It is sufficient to arbitrarily select the heating value Q of the heater 14 and the thickness X of the upper and lower adsorption layers 4A and 4B from the range satisfying the condition. For example, they can be obtained as follows.

First, the temperature in the portion closest to the heater 14 (X=0 mm) is set so as not to exceed the fire point of the fuel. When X=0 in the equation (1), T=Q+298.

When the temperature T of the fuel adsorption layer 4 is set so as not to exceed the fire point 473K (200° C.) of the fuel, Q<175W.

The heating value of the heater 14 is arbitrarily determined from the range. For example, Q is determined as 50W, and the thickness X of the upper and lower adsorption layers 4A and 4B is calculated by the equation (1) so that the temperature T of the fuel adsorption layer 4 at this time becomes equal to or higher than the boiling point 318K (45° C.) of the fuel.

$$-355Q \times X^2 - 815X + Q + 298 \geq 318$$

When the expression is solved, $X \leq 24$ mm is obtained. Therefore, the thickness X of the upper and lower adsorption layers 4A and 4B is set to be equal to or less than 24 mm. Similarly, when Q=40W, the thickness X of the upper and lower adsorption layers 4A and 4B is equal to or less than 18 mm ($X \leq 18$ mm). When Q=80W, the thickness X of the upper and lower adsorption layers 4A and 4B is equal to or less than 34 mm.

The relation between the heating value of the heater 14 and the shape of the fuel adsorption layer 4 (the distance from the heater 14 to the farthest portion which is the farthest from the heater 14 of the fuel adsorption layer 4) is not a one-to-one corresponding relation. When one of the values is determined, the other becomes a value in a certain range. Therefore, it is sufficient to properly determine the value within the range in accordance with a limit on the shape due to the mounting position of the canister 2 to the vehicle and an allowable power consumption according to the power source. When easiness of molding of the casing 3 of the canister 2 and filling of the activated carbon 20 is considered, X is desirably 5 mm or thicker.

The operation of the embodiment will now be described.

During operation of the engine, a negative pressure is generated in the intake pipe 7. When the purge valve 8 provided for the purge line 6 is opened, the outside air is introduced into the canister 2 from the atmosphere port 3c by the negative pressure.

Fuel vapors generated in the fuel tank 1 when the engine is stopped or at the time of feeding a fuel are adsorbed by the activated carbon 20 in the canister 2. The fuel vapors are desorbed from the activated carbon 20 by the introduced outside air, led from the purge port 3b via the purge line 6 (the purge valve 8: open) to the intake pipe 7, and burned in the engine.

When the fuel vapors are desorbed from the activated carbon 20, the fuel vapors become gases from the liquid while taking heat of vaporization, so that the temperature in the canister 2 decreases. Generally, the higher the temperature is, the higher the desorption performance is. Consequently, when the desorption performance deteriorates due to decrease in temperature, it is feared that the fuel vapors are not completely desorbed but remain and, when the vehicle is parked, the fuel vapors are diffused in the canister 2 and leak from the atmosphere port 3c.

In the embodiment, by passing a current to the heater 14 to heat the fuel adsorption layer 4 at the time of desorption, the temperature of the activated carbon 20 can be held at the boiling point of the fuel or higher. At this time, as described above, the heating value Q of the heater 14 and the thickness of the fuel adsorption layer 4 (the thickness X of upper and lower adsorption layers 4A and 4B) are set so that the lowest temperature in the fuel adsorption layer 4 becomes equal to or higher than the boiling point of the fuel and lower than the fire point.

Thus, decrease in the temperature of the activated carbon 20 at the time of desorption is prevented, the desorption performance is improved, and the fuel vapors adsorbed by the canister 2 are almost completely desorbed.

On the other hand, when the engine is stopped (when the vehicle is parked), no current is passed to the heater 14 and no negative pressure is generated in the intake pipe 7. Therefore, the fuel vapors are hardly desorbed from the activated carbon 20 but are adsorbed by the activated carbon 20. That is, the fuel vapors generated in the fuel tank 1 with an increase in temperature of the outside air pass through the evaporation line 5, flow into the canister 2, and are adsorbed by the activated carbon 20. At this time, as described above, since the fuel vapors in the canister 2 are almost completely desorbed from the activated carbon 20 when the engine operates, the canister 2 is able to sufficiently adsorb the fuel vapors. Consequently, the fuel vapors flowing in the canister 2 can be efficiently adsorbed.

In the embodiment, the heating value of the heater 14 and the thickness of the fuel adsorption layer 4 are set to proper values so that the temperature of the activated carbon 20 becomes equal to or higher than the boiling point of the fuel in the whole area of the fuel adsorption layer 4 formed in the canister 2. Consequently, by heating the fuel adsorption layer 4 with the heater 14 at the time of desorption, the whole activated carbon 20 can be heated to the boiling point of the fuel or higher. The desorption performance of the activated carbon 20 is accordingly improved, and almost all of the fuel vapors adsorbed can be desorbed. As a result, the fuel vapors do not remain in the canister 2, so that all of the fuel vapors flowed in at the time of adsorption can be adsorbed with reliability and, when the vehicle is parked, the remained fuel vapors can be prevented from being diffused in the canister 2 and released to the atmosphere from the atmosphere port 3c.

The heat gradient of the canister 2 of the embodiment at the time of adsorption is opposite to that at the time of desorption, and the adsorption heat generated at the time of adsorption can be released to the outside, so that an increase in temperature at the time of adsorption is suppressed. The canister 2 has therefore an additional value of increased adsorption performance. Since the amount of fuel vapors which can be adsorbed by the canister 2 increases, the adsorption performance can be improved without increasing the capacity of the canister 2. Further, since the fuel vapors do not remain in the fuel adsorption layer, the activated carbon 20 does not easily deteriorate, and the activated carbon amount conventionally increased in consideration of the deterioration amount (by about 20%) can be decreased. Thus, the smaller size of the canister 2 can be realized.

Although the heater 14 is disposed in the center of the fuel adsorption layer 4 in the embodiment, when the heating value Q of the heater 14 and the distance X from the heater 14 to the farthest part of the fuel adsorption layer 4 are set so that the temperature in the activated carbon in the farthest part from the heater 14 satisfies the equation (2), the heater 14 may be disposed on the wall face of the casing 3. Alternately, a plurality of heaters 14 may be disposed in the fuel adsorption layer 4.

Figures 7, 8:
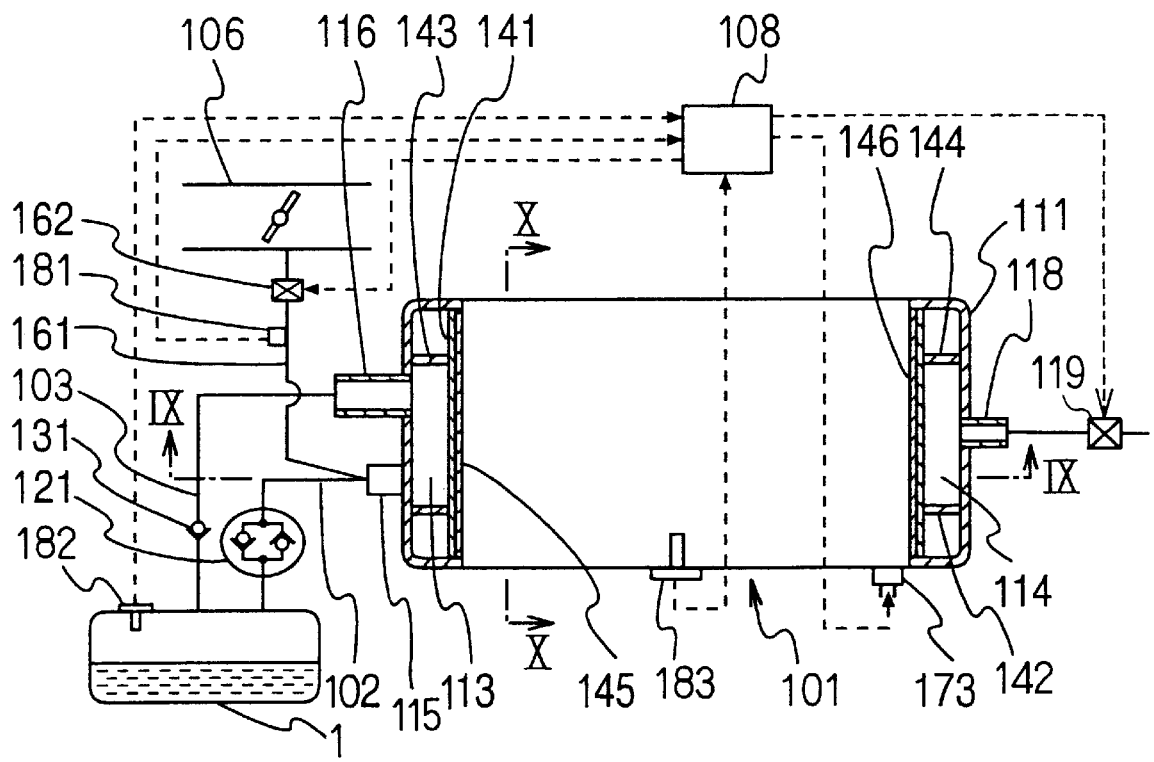
FIG. 7 is a table for comparing boiling points of various general fuels.
FIG. 8 is a configuration diagram showing the system of a fuel vapor control apparatus according to a second embodiment of the invention.

In the foregoing embodiment, the heating value of the heater 14 and the thickness of the fuel adsorption layer 4 are set so that the temperature T of the activated carbon 20 satisfies the equation (2). It is also possible to set the heating value of the heater 14 and the thickness of the fuel adsorption layer 4 so that the temperature T of the activated carbon 20 satisfies the relation of $45°\,C. \leq T < 200°\,C$. The values of $45°\,C.$ and $200°\,C.$ are determined in consideration that, except for special test fuels, as shown in FIG. 7, the boiling points of general fuels are about 45 to 60° C., and the fire point of a component having the lowest fire point included in the fuel is a little higher than 200° C.

Although the heater 14 is used as an example of temperature control means in the foregoing embodiment, since Q in the equation (1) denotes the heating value, the heaving value of temperature control means other than the heater 14 is obtained also in accordance with the equation (1). The equation (1) is used also in the case where the heater 14 is disposed on the outer wall of the canister 2. In the case of disposing the heater 14 on the outer wall of the canister 2, heat dissipated from the surface facing outward of the canister 2 does not work to heat the fuel adsorption layer 4. Consequently, the heating value Q in the equation (1) has to be regarded as, not the heating value of the heater 14 but, an amount of heat applied to the heat adsorption layer 4. In other words, when the heating value Q in the equation (1) is regarded as an amount of heat applied to the fuel adsorption layer 4, the equation (1) can be applied in any of the configurations.

Second Embodiment

A second embodiment of the invention will be described hereinbelow with reference to the drawings. FIG. 8 shows the configuration of a fuel vapor control apparatus. A canister 101 is connected to the fuel tank 1 of a vehicle engine via an evaporation line 102 as a fuel vapor path and a fuel feeding line 103. In some midpoints of the evaporation line 102 and fuel feeding line 103, a tank internal pressure valve 121 and a fuel feeding valve 131 which will be described hereinlater are provided, respectively. The valves are opened to release the fuel vapors when the tank internal pressure exceeds a predetermined pressure by an increase in atmosphere temperature or feeding of a fuel.

Figure 9:
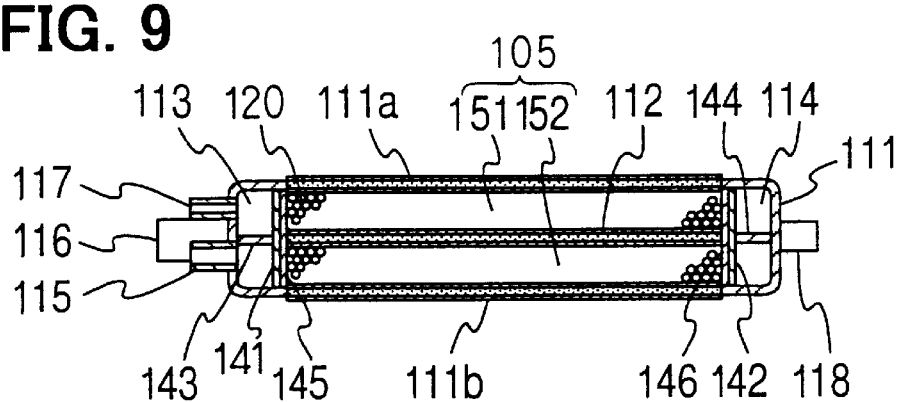
FIG. 9 is a cross section taken along line IX—IX of FIG. 8.
Figure 10:
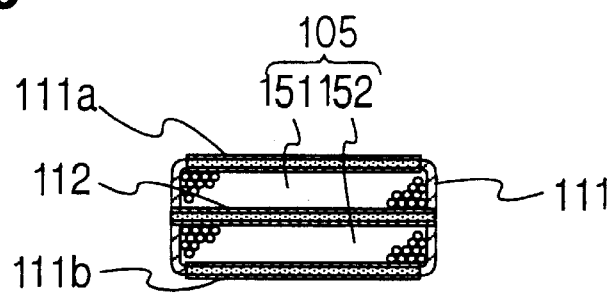
FIG. 10 is a cross section taken along line X—X of FIG. 8.

As shown in FIG. 9, in a cylindrical casing 111 serving as the outer wall of the canister 101, porous plates 141 and 142 are disposed near the both end faces of the cylindrical casing 111. By filling the space between the porous plates 141 and 142 with activated carbon 120, a fuel adsorption layer 105 is formed. The fuel adsorption layer 105 is used to temporarily adsorb and store fuel vapors released from the fuel tank 1 and is further partitioned into two adsorption layers 151 and 152 by a partition wall 112 parallel to the flow direction of the fuel vapors (lateral direction of the drawing). In the embodiment, the casing 111 is formed so that its cross section perpendicular to the flow direction (lateral direction in the drawing) of the fuel vapors shown in FIG. 10 becomes a flat rectangular shape. The partition wall 112 is provided so that its short side is divided into two parts in parallel with wall faces 111a and 111b including its long sides. That is, the partitioned adsorption layers 151 and 152 are layers having the same shape and each having a rectangular cross section which is flatter. To enable the whole activated carbon 120 to be controlled by temperature control means, the thickness of each of the absorption layers 151 and 152 is set to 50 mm or less so that the whole area of each of the adsorption layers 151 and 152 is positioned within 25 mm from temperature control means to be described hereinlater.

A space 114 is formed between the right end face of the casing 111 and the porous plate 142, and a space 113 is formed between the left end face of the casing 111 and the porous plate 142, so that the fuel vapors or atmosphere is/are equally distributed to the adsorption layers 151 and 152. The fuel adsorption layer 105 is sandwiched by spring force of springs 143 and 144 disposed in the spaces 113 and 114, respectively. A filter 145 is disposed between the porous plate 141 and the activated carbon 120, and a filter 146 is disposed between the porous plate 142 and the activated carbon 120, thereby preventing the activated carbon 120 from falling out.

On the left end face of the casing 111, a tank port 115 communicating with the evaporation line 102, a fuel feeding port 116 communicating with the fuel feeding line 103 at the time of fuel feeding, and a purge port 117 are provided. The purge port 117 is communicated with an intake pipe 106 of the engine as an intake path via a purge line 161, and a purge valve 162 for adjusting a purge flow rate is provided in some midpoint of the purge line 161. An HC concentration sensor 181 for monitoring the concentration of purge gas is installed between the purge valve 162 and the canister 101. An atmosphere port 118 communicated with atmosphere is formed on the right end face of the casing 111.

The internal pressure valve 121 disposed in some midpoint of the evaporation line 102 is constructed so as to open/close in accordance with a change in the internal pressure of the fuel tank 1 (both in the positive and negative pressure sides). The internal pressure valve 121 is comprised of an exhaust valve (positive pressure side) which opens to exhaust the fuel vapors to the canister 101 when the internal pressure of the fuel tank 1 increases and becomes equal to or higher than a set pressure, and an intake valve (negative pressure side) which opens to take the outside air when the internal pressure of the fuel tank 1 decreases and becomes below the set value. The set pressure for the exhaust valve and that for the intake valve are determined in consideration of resistance to pressure of the fuel tank 1 and the like. The fuel feeding valve 131 disposed in some midpoint of the fuel feeding line 103 is used to transmit a large amount of fuel vapors generated at the time of fuel feeding to the canister 101 and is constructed to open only at the time of feeding a fuel. A pressure sensor 182 for monitoring the tank inner pressure is provided for the fuel tank 1, and a temperature sensor 183 for monitoring the temperature of the activated carbon 120 is mounted in the canister 101.

Figure 11:
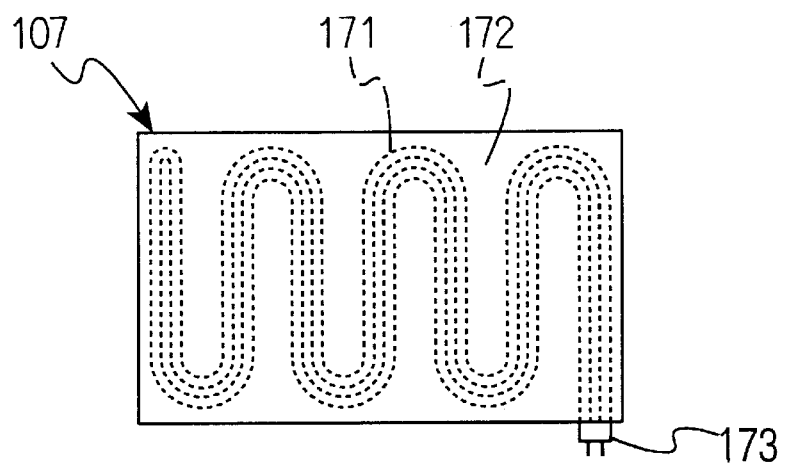
FIG. 11 is a plan view of a heater plate.
Figure 12:
FIG. 12 is a cross section of the heater plate.

In the embodiment, in the wall face of the casing 11 in contact with the fuel adsorption layer 105, wall faces 111a and 111b of large area and the partition wall 112 for partitioning the adsorption layers 151 and 152 are constructed by a heater plate 107 as temperature control means. As shown in FIGS. 11 and 12, the heater plate 107 houses a heating-wire heater 171 as a heating element almost in the entire hollow in a state where the heater 171 is covered with an insulating material 172 so as to prevent deterioration in the efficiency of heat transfer as much as possible. The activated carbon 120 and the heating element are arranged so as not to be in direct contact with each other. The heater plate 107 body is made of a metal having excellent efficiency of heat transfer, for example, stainless steel. A connector 173 to be connected to the heating-wire heater 171 is provided at an end of each of the heater plates 107 and is connected to a voltage adjuster (not shown). Obviously, in place of the heating-wire heater 71, the temperature control means may takes the form of other heating elements such as a PTC heater.

Passage of a current to the heater plate 107 is controlled by a control means 108. To the control means 108, the opening of the purge valve 162, remaining fuel amount, operating conditions of the engine, and the like and detection results of the HC concentration sensor 181, pressure sensor 182, and temperature sensor 183 are always input. On the basis of the data, the control means 108 passes the current to the heater plate 107, thereby heating the fuel adsorption layer 105 to promote purging from the activated carbon 120. Since each of the adsorption layers 151 and 152 is formed in a flat shape with a thickness of 50 mm or less and the heater plate 107 is mounted in the casing wall faces 111a and 111b on both sides of the adsorption layers 151 and 152 and the partition wall 112, the whole area of each of the adsorption layers 151 and 152 is positioned within 25 mm from the heater plate 107. Thus, as described by referring to FIG. 29, the whole activated carbon 120 is effectively heated and the desorbing efficiency can be improved.

The operation of the fuel vapor control apparatus will be described with respect to the state where the engine operates, the state where the engine stops, and the state where a fuel is fed. In the state where the engine operates, the pressure in the intake pipe 106 becomes negative. Consequently, the purge valve 162 is opened to introduce the outside air from the atmosphere port 118, thereby enabling a large amount of fuel vapors in the canister 101 to be purged. The fuel vapors generated in the fuel tank 1 are adsorbed by the canister 101 when the engine stops or at the time of feeding a fuel. In association with introduction of the outside air, the fuel vapors are desorbed from the activated carbon 120 of the fuel adsorption layer 105, introduced from the purge port 117 into the intake pipe 106 via the purge line 161 and purge valve 162, and burned in the engine. Although the fuel vapors generated as the outside air temperature increases flow into the canister 101 also during the engine operation, they can be easily purged by the intake pipe negative pressure.

When the fuel vapors are desorbed from the activated carbon 120 of the fuel adsorption layer 105, they are vaporized from the liquid, so that the heat of evaporation is taken, and the temperature in the canister 101 decreases. Generally, the higher the temperature is, the higher the desorption performance is. Consequently, it is feared that the desorption performance deteriorates in the portion where the temperature decreases, the fuel vapors are not completely desorbed and, during parking of the vehicle, the fuel vapors are diffused in the canister 101 and leak from the atmosphere port 118. In the embodiment, therefore, the heater plate 107 also serving as the casing wall faces 111a and 111b in contact with the adsorption layers 151 and 152 and the partition wall 12 is disposed, and a current is passed to the heater plate 107 to perform heating as necessary, thereby preventing the temperature drop of the activated carbon 120 and improving the desorption performance.

Figure 13:
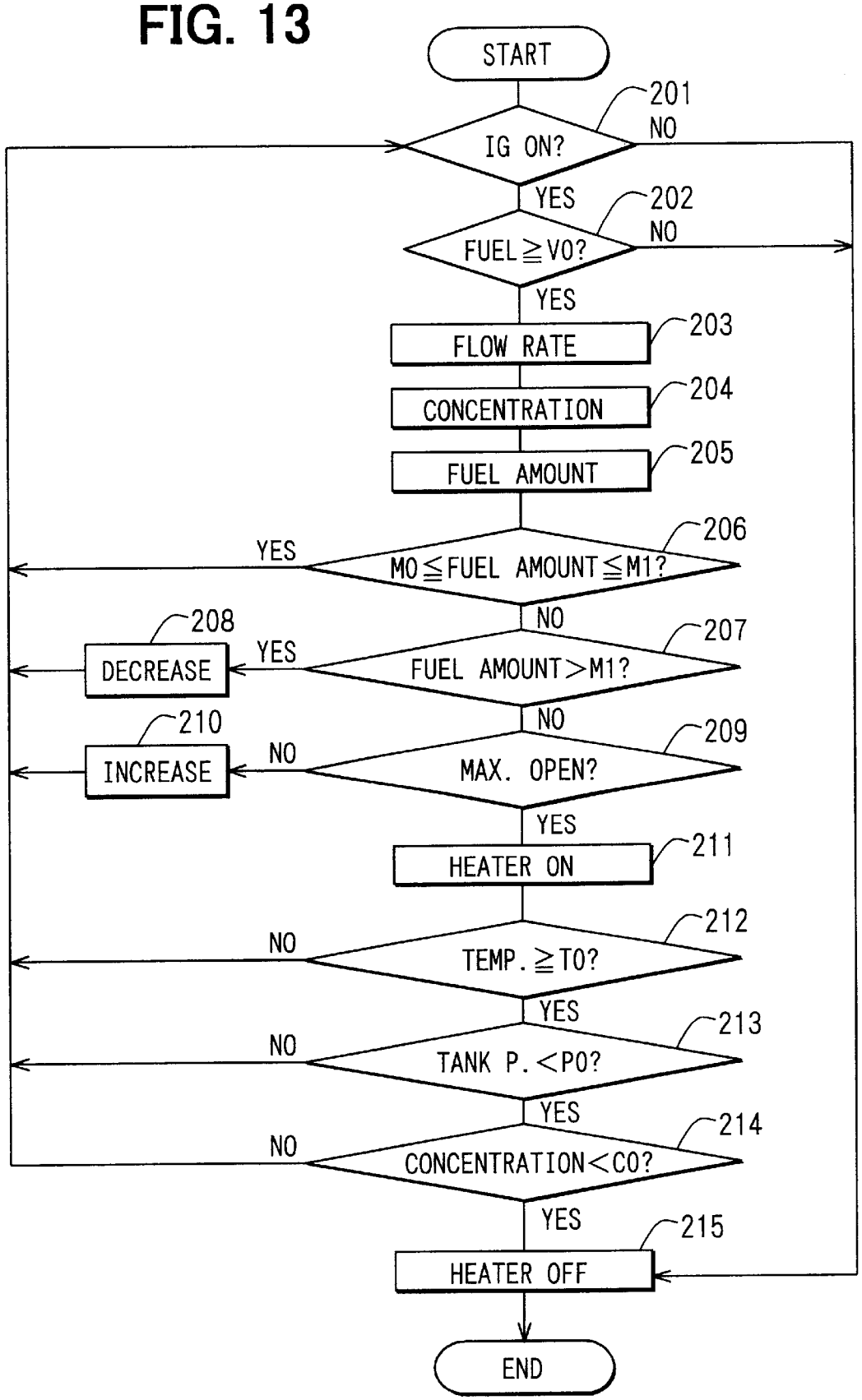
FIG. 13 is a flowchart showing a control process of the fuel vapor control apparatus according to the second embodiment.

FIG. 13 shows a flowchart of the temperature control performed by the control means 108 when the engine operates. The temperature control is executed by the control means 108 in predetermined cycles. In FIG. 13, when a canister temperature control routine starts, first, whether the engine is in an operating state or not, that is, when an IG (ignition) switch is in the On position or not is determined in step 201. When the IG switch is ON, the program advances to step 202 where whether the remaining fuel amount detected by using the level of a liquid (not shown) or the like is equal to or larger than a predetermined amount V0 is determined. If the remaining fuel amount is smaller than the predetermined amount V0, the control routine is finished. Step 202 is performed to prevent the fuel vapors from being adsorbed in a state where the canister 101 is heated at the time of refueling. When the temperature of the activated carbon is high, although it is advantageous for desorption, it is disadvantageous for adsorption. Therefore, when it is determined that the fuel remaining amount is small, the temperature control is stopped. This will be described hereinlater.

When the fuel remaining amount is equal to or larger than the predetermined amount V0 in step 202, the program advances to step 203. In step 203, the purge flow rate which is unconditionally determined by the negative pressure of the intake pipe 106 and the opening of the purge valve 161 is input. In step 204, the concentration of the purge gas obtained by the HC concentration sensor 181 is input. In step 205, the purge fuel amount is calculated from the purge flow rate and the concentration of the purge gas. In step 206, whether the purge fuel amount lies within a predetermined range or not is determined. The amount in the predetermined range (M0≦purge fuel amount≦M1) denotes an amount in a range where poor combustion and deterioration in exhaust emission are not caused when the purge gas is introduced into the air intake system.

If the purge fuel amount is within the predetermined range in step 206, the program returns to step 201. If the purge fuel amount is out of the predetermined range, the program advances to step 207. In step 207, whether the purge fuel amount out of the predetermined range is larger than the maximum value M1 of the range or not is determined. If YES, the program advances to step 208 where the opening of the purge valve 162 is narrowed to reduce the purge fuel amount. After that, the program returns to step 201.

If the purge fuel amount is equal to or smaller than the maximum value M1 in step 207, it is determined that the purge fuel amount is less than the minimum value M0, and the program advances to step 209 where whether the opening of the purge valve 162 is the maximum or not is determined. If the opening of the purge valve 162 is not the maximum, the program advances to step 210 where the opening of the purge valve 162 is widened to increase the purge fuel amount. When the opening of the purge valve 162 is the maximum, it is determined that the purge fuel amount cannot be assured any more in the present state, and the program advances to step 211 where the power is supplied to the heater plate 107.

The amount of the purge fuel introduced into the engine via the intake pipe 106 changes according to not only the concentration of the purge gas but also the flow rate of the fuel that flows in the intake pipe 106. Therefore, the purge fuel amount is calculated on the basis of those values in steps 203 to 205, and the opening of the purge valve 162 and the operation of the heater plate 107 are controlled so that the purge fuel amount lies within the predetermined range (steps 206 to 211). At this time, first, the opening of the purge valve 162 is adjusted. If the predetermined purge fuel amount cannot be obtained by the adjustment, heating by the heater plate 107 is started. By the operation, the purge fuel amount is controlled to be within the predetermined range, the fluctuation in the air-fuel ratio is prevented, and poor combustion and deterioration in exhaust emission can be prevented.

Subsequently, the detection result of the temperature sensor 182 is read in step 212 and whether the temperature of the activated carbon in the canister 101 is equal to or higher than the predetermined temperature T0 is determined. In this case, it is desirable that the predetermined temperature T0 is a temperature at which the fuel vapors in the canister 101 can be completely desorbed, which is usually 100° C. or higher. If the temperature of the activated carbon does not reach the predetermined temperature T0 in step 212, the program returns to step 201. If the temperature of the activated carbon is the predetermined temperature T0 or higher, the program advances to step 213. In step 213, the detection result of the pressure sensor 182 for monitoring the tank internal pressure is read and whether or not the tank internal pressure is lower than the predetermined pressure P0 which is, in this case, the pressure obtained when the exhaust valve in the tank internal pressure valve 121 is open is determined. If the tank internal pressure is equal to or higher than the predetermined pressure P0, it is determined that the tank internal pressure valve 121 is open, and the fuel vapors flow in the canister 101, so that the program returns to step 201.

When the tank internal pressure is lower than the predetermined pressure P0, it is determined that the fuel vapors do not flow in the canister 101, and the program advances to step 214 where whether the concentration of purge gas monitored by the HC concentration sensor 181 is equal to or higher than the predetermined concentration C0 or not is determined. If the purge gas concentration is equal to or higher than the predetermined concentration C0, the program returns to step 201. If the purge gas concentration is lower than the predetermined concentration C0, it is determined that the fuel vapors do not remain in the canister 101, the program advances to step 215 where the supply of the power to the heater plate 107 is stopped, and the control routine is finished.

Steps 213 and 214 are performed to decrease the power consumption. In the case where the tank internal pressure is lower than the valve opening pressure and the purge gas concentration is lower than the predetermined concentration, it is determined that heating by the heater plate 107 is unnecessary. By stopping the temperature control, the power consumption is reduced, and the costs can be reduced.

On the other hand, in the state where the engine stops, the power source of the heater plate 107 is off, and there is no negative pressure in the intake pipe, so that only the fuel vapors generated as the temperature of outside air rises are adsorbed by the canister 101. Specifically, when the fuel vapors are generated in the fuel tank 1 and the tank internal pressure increases equal to or higher than the predetermined value, the exhaust valve of the tank internal pressure valve 121 is opened, and the fuel vapors are exhausted to the canister 101 via the evaporation line 102 and tank port 115. Since the fuel vapors in the canister 101 are almost completely desorbed when the engine operates, the canister 101 is in a state where it can sufficiently adsorb the fuel vapors from the fuel tank 1 and can efficiently adsorb the fuel vapors that flow in. Since the fuel vapors do not remain in the canister 101, unlike the conventional technique, the remaining fuel vapors can be prevented from being diffused in the canister 101 when the engine stops and from being released to the atmosphere from the atmosphere port 118.

At the time of feeding a fuel, the fuel vapors remained in the fuel tank 1 are pushed by the fed fuel to open the fuel feeding valve 131 and flow from the feeding line 103 into the canister 101 via the fuel feeding port 117. At this time, when the temperature of the activated carbon is high, the adsorption performance deteriorates. Consequently, prior to the feeding of fuel, the temperature control by the heater plate 107 is stopped. To be specific, in the control routine of FIG. 13, when the remaining fuel amount decreases below the predetermined amount V0, it is determined that the feeding of fuel is necessary (step 202), and the control to stop the supply of power to the heater plate 107 is performed (step 215). The predetermined amount V0 in step 202 is usually set to an amount slightly larger than the remaining fuel amount with which feeding of fuel is necessary, for example, a quarter of the nominal capacity. Since the temperature control is interrupted at the time point the remaining fuel amount becomes below the quarter of the nominal capacity, the canister temperature returns to an almost ordinary temperature by the time of the feeding of fuel, and adsorption in the state where the temperature of the canister 101, that is, the activated carbon is high can be prevented.

In the case of feeding fuel in a state where the remaining fuel amount is larger than the predetermined amount V0 or immediately after the remaining fuel amount reaches the predetermined amount V0, the power supplied to the heater plate 107 is stopped by the engine stop or at the time when the remaining fuel amount reaches the predetermined amount V0 (steps 201 and 202), so that the current is passed to the heater plate 107 just before the fuel is fed. In the cases, since the time up to the feeding of fuel is short, there is a case that the temperature of the activated carbon does not sufficiently decrease and the fuel vapors are adsorbed. Since the fuel feeding amount in this case is relatively small and the amount of fuel vapors generated is proportional to the fuel feeding amount, the fuel vapors flowing in the canister 101 is not so much, and desorption of the fuel vapors in the canister 101 is almost completed, so that all of the amount of fuel vapors generated can be adsorbed. The remaining fuel amount V0 at which the power to the heater plate 107 is stopped is set to the optimum value obtained from the capacity of the activated carbon 120 of the canister 101, the size of the fuel tank 1, and the flow rate of fuel vapors to the canister 101, so that all of the fuel vapors which flow in at the time of feeding fuel can be adsorbed.

As described above, with the configuration, by heating the plurality of adsorption layers 151 and 152 with the heater plate 107 provided for the wall face, the whole activated carbon 120 is efficiently heated to thereby enable almost all of the fuel vapors adsorbed to be desorbed. Since each of the adsorption layers 151 and 152 has a flat shape and all of the area of the adsorption layers 151 and 152 is positioned within 25 mm from the heater plate 107, there is no area which is not heated, and the desorption performance is largely improved. Therefore, since the fuel vapors do not remain in the canister 101, all of the fuel vapors released on adsorption of the next time can be adsorbed with reliability. The fuel vapors can be prevented from being diffused in the canister 101 and leaking from the atmosphere port 118 while the vehicle is parked. Deterioration in the activated carbon 120 which occurs about 20% in the conventional apparatuses hardly occurs. Since it is unnecessary to increase the amount in consideration of the deterioration, the smaller size of the canister 101 can be realized. By performing the above-described control also in the second and third embodiments, similar effects can be obtained.

Figure 14:
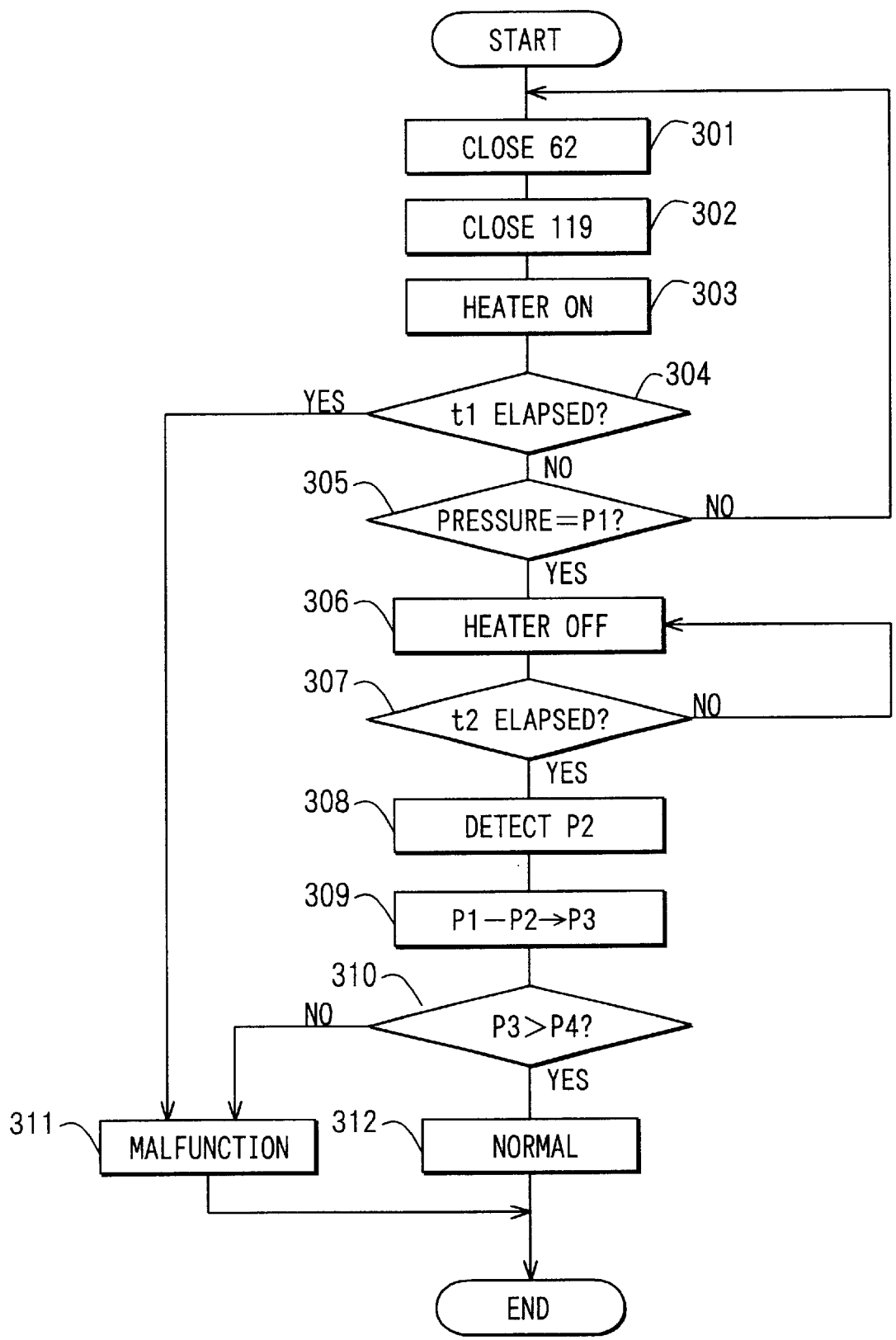
FIG. 14 is a flowchart showing a diagnosing process applied to the fuel vapor control apparatus according to the second embodiment.

Further, in the apparatus having the heater plate 107 of the above configuration, diagnosis for a failure can be made. This will be described by using the control routine of FIG. 14. In FIG. 14, when a diagnosis control routine starts, first, the purge valve 162 is closed in step 301, and a canister closed valve 119 disposed downstream of the atmosphere port 118 of the canister 101 is closed in step 302. Consequently, the fuel vapor path extending from the fuel tank 1 to the purge valve 162 of the intake system via the canister 101 becomes a closed space. When the power is supplied to the heater plate 107 in step 303, the gas in the closed space is heated and expanded, and the pressure in the closed space increases. The power is supplied to the heater plate 107 until the pressure reaches a predetermined pressure P1, and elapsed time to reach the predetermined pressure P1 is monitored in step 304. By supplying the power to the heater plate 107, the pressure in the closed space increases. However, when there is a hole in the closed space, the increase speed is slow and, depending on the size of the hole, considerably long time is required until the pressure reaches the predetermined pressure P1. In step 304, an arbitrary time t1 is preliminarily calculated by experiments or the like and, if it takes more than the time t1, a malfunction is determined that there is obviously a hole in the closed space.

The determining method is a simple method suited for determining a relatively large leak hole. A small hole is determined by the following steps. In step 305, the pressure in the closed space is monitored. When the pressure reaches the predetermined pressure P1 within the time t1, the passage of a current to the heater plate 107 is stopped in step 306. Time elapsed since the current to the heater plate 107 is stopped is monitored in step 307, and a pressure P2 in the closed space after elapse of the time t2 is measured in step 308. Residual heat of the heater plate 107 makes the pressure in the closed space slightly increase. If there is a leak in the closed space, the pressure in the closed space gradually decreases although the decrease speed varies according to the size of the leak hole, the remaining fuel amount, and the like. In step 309, by calculating "P2−P1", P3 is obtained. In step 310, P3 is compared with an arbitrary specific pressure P4. The specific pressure P4 is the maximum value of the leak hole which is permissible to the system in decrease in pressure which occurs at the time of an arbitrary remaining fuel amount. When P3 is higher than P4, it is regarded that the leak hole exceeds the permissible range, and a malfunction is determined in step 311. In other cases, the normal state is determined in step 312.

As described above, in the apparatus having the heater plate 107, by using the heater plate 107 as pressurizing means, the presence or absence of a leak can be easily determined without changing the configuration. When the specific pressure is determined in a state where the degree of decrease in pressure with respect to the remaining fuel amount and the size of the leak hole is grasped, every leak hole can be dealt with.

Figure 15:
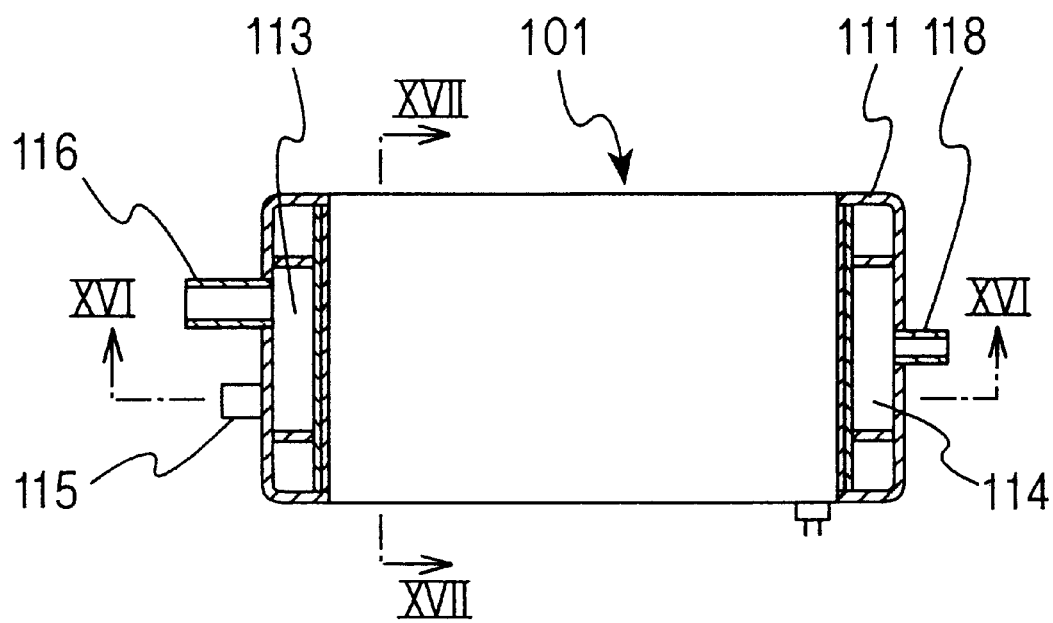
FIG. 15 is a configuration diagram showing the system of a fuel vapor control apparatus according to a third embodiment of the invention.
Figure 16:
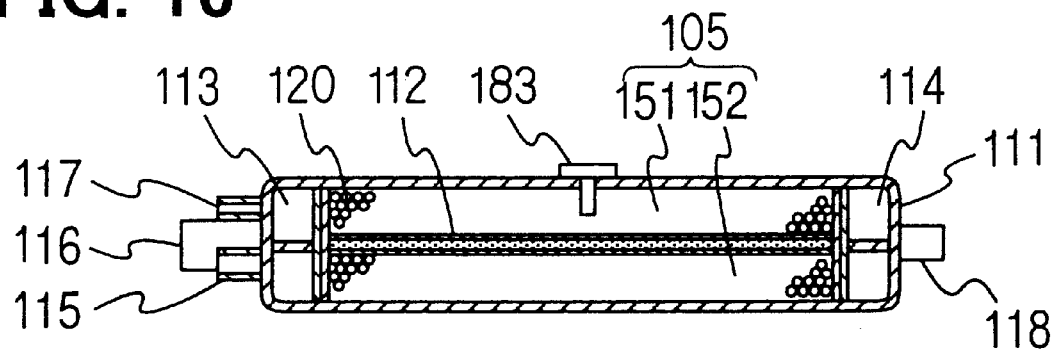
FIG. 16 is a cross section taken along line XVI—XVI of FIG. 13.
Figure 17:
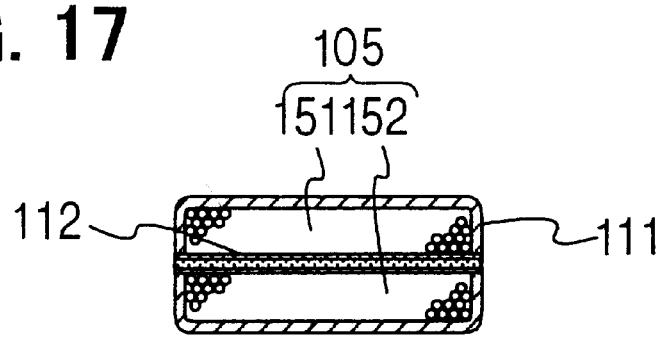
FIG. 17 is a cross section taken along line XVII—XVII of FIG. 13.

In the first embodiment, the heater plate 107 is disposed in the wall faces 111a and 111b of the large area and the partition wall 112 in the casing 111, that is, in two side faces of large area out of the side faces surrounding the adsorption layers 151 and 152. As shown in FIGS. 15 to 17 as a third embodiment, only the partition wall 112 for partitioning the adsorption layers 151 and 152 can be constructed by the heater plate 107. When each of the adsorption layers 151 and 152 is formed thinly with a thickness of 25 mm or less and the whole activated carbon 120 can be sufficiently heated only by heating from one side face, in a manner similar to the above, the configuration becomes simpler and the cost can be reduced.

An effect produced when the temperature control is performed by heating at the time of desorption of the fuel vapors will be described by using a simple structure that the temperature control means is disposed in the center of the fuel adsorption layer as shown in FIGS. 15 to 17. Heat conduction after time has elapsed sufficiently since the temperature control means has operated and a stationary state is obtained is expressed by the following equation (3).

$$\nabla^2 T + Q/\lambda = 0 \qquad (3)$$

where, $\nabla^2 = \partial^2/\partial x^2 + \partial y^2 + \partial z^2$

Figure 29:
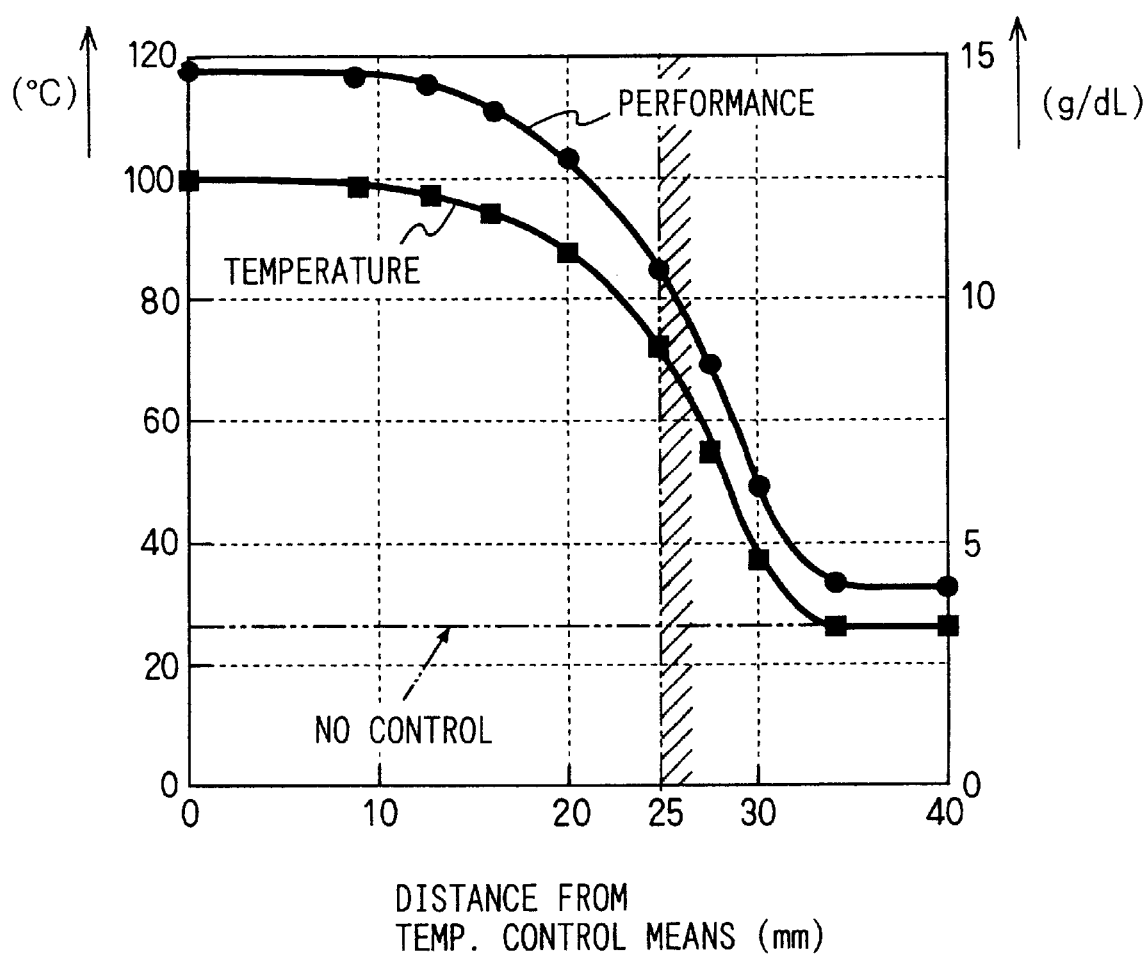
FIG. 29 is a graph showing an adsorption layer temperature and desorption performance with respect to distance from temperature control means.

T: temperature
Q: heating value of the temperature control means
λ: efficiency of heat transfer of the fuel adsorption layer As an example, in the case where the temperature at the boundary between the temperature control means and the adsorption layer: 100° C., the temperature at the boundary between the adsorption layer and the casing: 25° C., and the adsorption layer: activated carbon obtained from coal (efficiency of heat transfer: 0.2 W/mK), when the temperature distribution of the adsorption layer in the direction perpendicular to the temperature control means is obtained by the equation (3), the temperature distribution as shown in FIG. 29 is obtained. As described above, the adsorption performance of the activated carbon is largely influenced by temperature and it is known that the higher the temperature is, the more the desorption performance increases. When the temperature shown in FIG. 29 is applied to the desorption performance of activated carbon obtained from coal, the desorption performance changes as shown in FIG. 29. As shown in FIG. 29, as the distance from the temperature control means increases, the temperature decreases, and the desorption performance deteriorates accordingly. The shorter the distance form the temperature control means is, the higher the effect of temperature control is.

It is understood from FIG. 29 that when the activated carbon is disposed within 25 mm from the temperature control means, the effect of the temperature control can be sufficiently produced (performance twice as high as the performance in a state where the temperature control is not performed by the temperature control means can be obtained). When the activated carbon is positioned apart from the temperature control means by 30 mm or more, the desorption performance is almost the same as that in the case where no temperature control is executed, and an effect of temperature control is small. The desorption performance of FIG. 29 changes according to the power of the activated carbon. Since the relation between the desorption performance and the temperature is linear with respect to most of activated carbons, even when the activated carbon is changed, the ratio of improvement in desorption performance does not change. Although the area in which the effect of temperature control is produced can be widened to 25 mm or more by increasing the temperature of the temperature control means, power consumption increases and it causes deterioration in fuel consumption.

As described above, the temperature control means is disposed, the whole area of the fuel adsorption layer is disposed within 25 mm from the heat control means, and the heating value (or heat absorption amount) of the heat control means is properly set, thereby enabling each of adsorption layers in the fuel adsorption layer to be efficiently heated or cooled. Thus, there is no area which is not heated, and the temperature of the whole adsorbent can be controlled, so that the adsorption performance can be largely improved. For example, by heating each of the adsorption layers at the time of desorption by the temperature control means, desorption is promoted, the fuel vapors do not remain in the fuel adsorption layer and can be prevented from being released to the atmosphere while the vehicle is parked. Since the fuel vapors do not remain in the fuel adsorption layer, the amount of fuel vapors which can be adsorbed increases, and the adsorption performance is improved without increasing the capacity of the canister. The adsorbent does not easily deteriorate. Therefore, the amount of adsorbent increased in consideration of the deterioration amount (about 20%) can be decreased, so that reduction in size can be realized.

Figure 18:
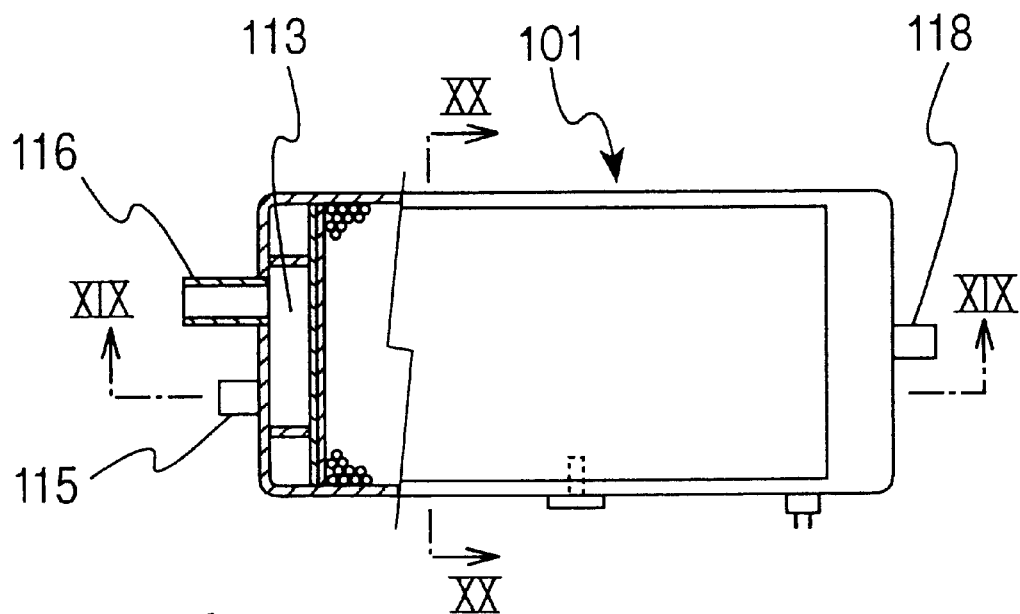
FIG. 18 is a partial cross section showing a canister according to a fourth embodiment of the invention.
Figure 19:
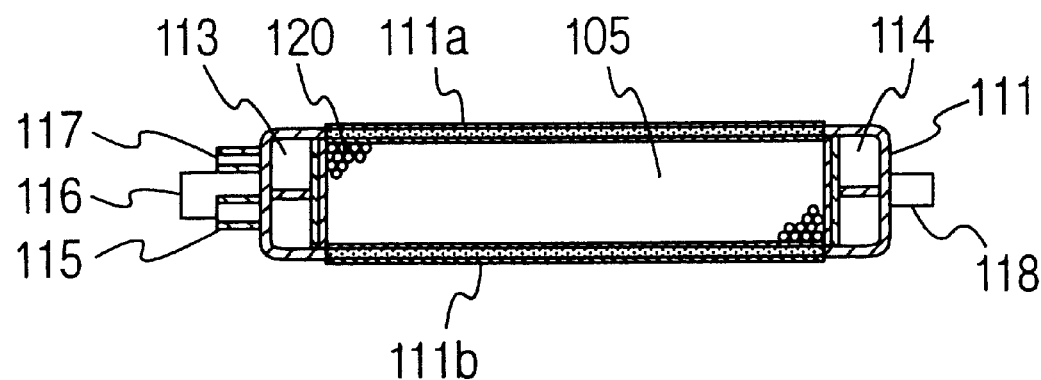
FIG. 19 is a cross section taken along line XIX—XIX of FIG. 18.
Figure 20:
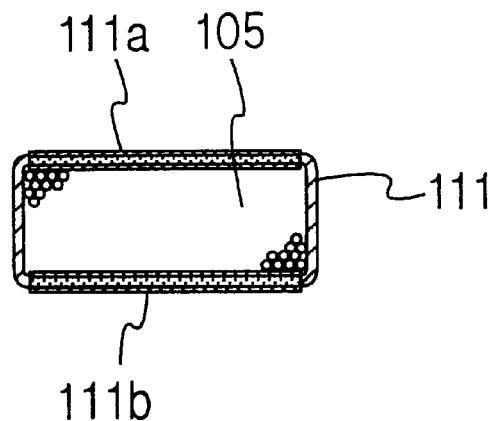
FIG. 20 is a cross section taken along line XX—XX of FIG. 18.

Alternately, as shown in FIGS. 18 to 20 as a fourth embodiment, if the whole area of the fuel adsorption layer 105 is positioned within 25 mm from the heater plate 107, the area may not be divided into a plurality of parts. In this case, the wall faces 111a and 111b of larger area in the casing 111 are constructed by the heater plate 7. In such a manner as well, a similar effect can be obtained. With the simplified configuration, the cost can be reduced.

Figure 21:
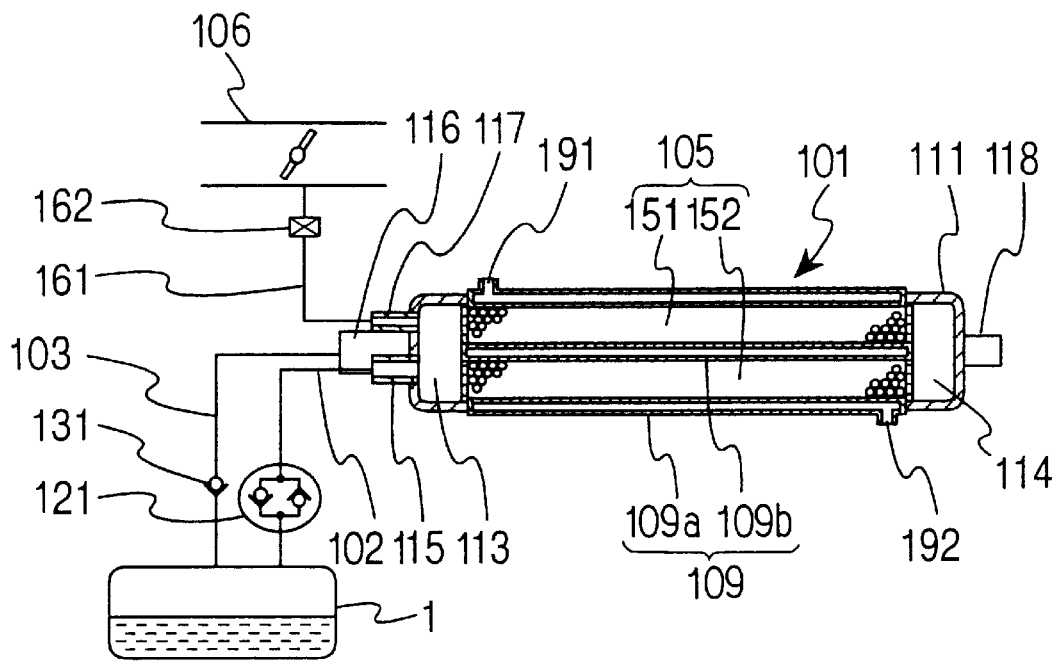
FIG. 21 is a configuration diagram showing the system of a fuel vapor control apparatus according to a fifth embodiment of the invention.
Figure 22:
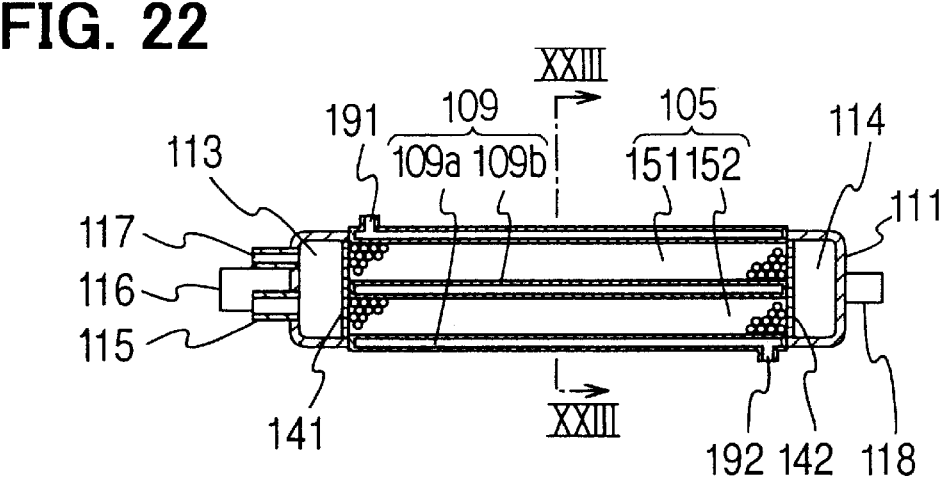
FIG. 22 is a cross section of a canister according to the fifth embodiment of the invention.
Figure 23:
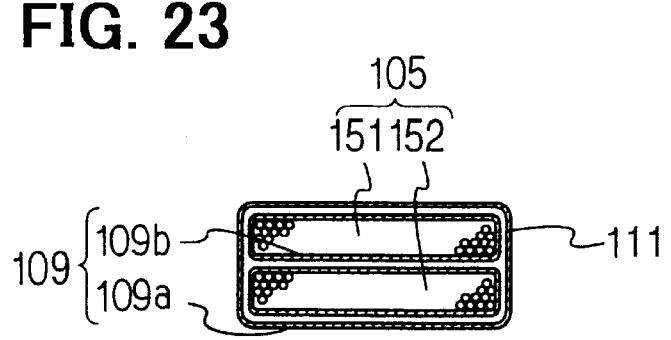
FIG. 23 is a cross section taken along line XXIII—XXIII of FIG. 22.

FIGS. 21 to 23 show a fifth embodiment. In the foregoing embodiments, the heater plate 107 as temperature control means is used to control the temperature of the activated carbon 120 at the time of desorption, thereby improving the desorption performance. In the fifth embodiment, temperature control means capable of controlling the temperature not only at the time of desorption but also adsorption is provided. FIG. 21 shows a schematic configuration of a fuel vapor control apparatus of the embodiment. The configuration other than the canister 101 is similar to that of each of the foregoing embodiments, and the different point will be mainly described hereinbelow.

As shown in FIGS. 21 and 22, the canister 101 has the fuel adsorption layer 5 filled with the activated carbon 120 between the porous plates 141 and 142 disposed in the cylindrical casing 111. The space 113 is formed between the porous plate 141 and the casing 111, and the space 114 is formed between the porous plate 142 and the casing 111. A filter (not shown) for holding the activated carbon 120 is interposed on the inside of the porous plates 141 and 142. The fuel adsorption layer 105 is partitioned into two adsorption layers 151 and 152 parallel with the flow direction of the fuel vapors (lateral direction of FIG. 22). A temperature control layer 109 as temperature control means is disposed throughout the length in the flow direction of the fuel adsorption layer 105 so as to surround the adsorption layers 151 and 152 (FIG. 23).

In the embodiment as well, the casing 111 is formed so that its cross section perpendicular to the flow direction of fuel vapors (lateral direction of FIG. 21) has a flat rectangle, and a layer 109b serving as a partition wall is provided in parallel with the wall face including the long side of the casing 111 so as to equally divide the short side. That is, the two adsorption layers 151 and 152 become layers of the same shape having a flatter rectangular cross section. With a configuration such that the whole area of each of the adsorption layers 151 and 152 is positioned within 25 mm from the temperature control layer 109, all the area is subjected to temperature control, and adsorption and desorption can be effectively performed.

In FIGS. 22 and 23, the temperature control layer 109 is constructed by a layer 109a serving as the outer wall of the casing 111, and the layer 109b serving as a partition wall for partitioning the two adsorption layers 151 and 152. The layers 109a and 109b communicate with each other. Each of the layers 109a and 109b serves as a flow path through which a medium for heating or cooling the activated carbon 120 flows on the inside of the hollow of the casing 111. Via ports 191 and 192 provided at the upper left part and at the lower right part of the layer 191a on the outer side, the flow paths are communicated with the outside. The wall face of the temperature control layer 109 in contact with the adsorption layers 151 and 152 is made of a material having a high heat transfer rate such as a metal, so that heat exchange is promoted, and the temperature control effect can be increased.

For example, the port 191 at the upper left part of the temperature control layer 109 is used as a medium lead-in port, and the port 192 at the lower right part is used as a medium lead-out port. At the time of adsorption when the temperature of the activated carbon increases, a medium for cooling is passed. At the time of desorption when the temperature of the activated carbon decreases, a medium for heating is passed. In such a manner, the adsorption and desorption performance can be improved. Specifically, at the time of adsorption, heat dissipation of the activated carbon 120 is promoted to suppress increase in temperature. At the time of desorption, decrease in temperature of the activated carbon is suppressed. Thus, adsorption and desorption can be performed effectively. A concrete example will be described hereinbelow.

Figure 24:
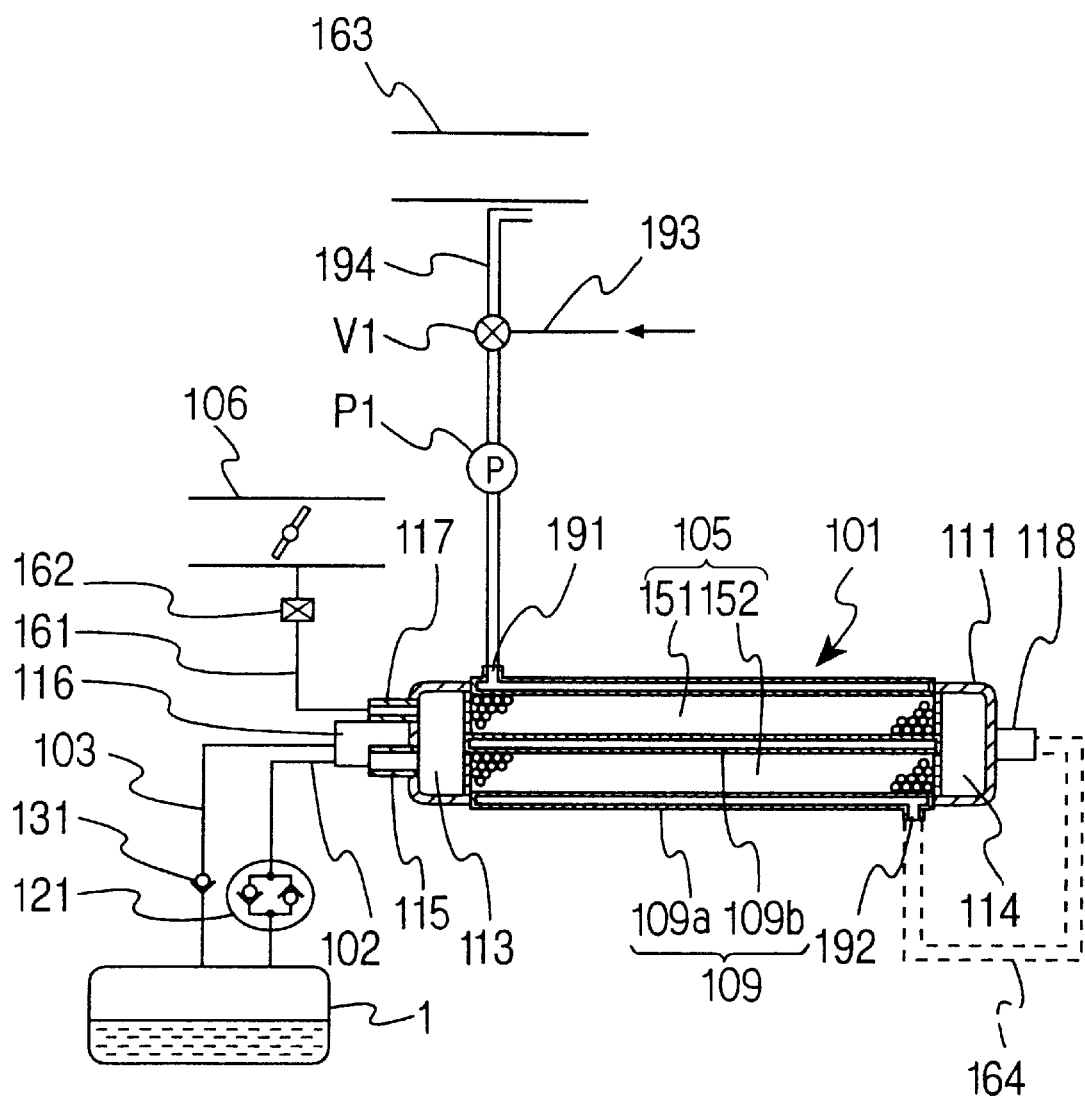
FIG. 24 is a configuration diagram showing the system of a fuel vapor control apparatus according to a sixth embodiment of the invention.

FIG. 24 shows a sixth embodiment. As shown in the diagram, in the temperature control layer 109 of the canister 101, an air pump P1 is connected to the lead-in port 191, and paths 193 and 194 are connected to the air pump P1 via a three way valve V1 so as to switch a medium between a medium introduced at the time of adsorption and a medium introduced at the time of desorption. The path 193 is communicated with the outside air as a cooling medium, and the path 194 extends close to an exhaust pipe 163. An air heated by the heat of exhaust is introduced as a heating medium into the path 194.

In the configuration, at the time of adsorption of the fuel vapors (at the time of engine stop or fuel feeding), the three way valve V1 is opened to the path 193 side to introduce the outside air as a cooling medium into the temperature control layer 109 by the air pump P1. On the other hand, the fuel vapors generated in the fuel tank 1 are released via the evaporation line 102 or fuel feeding line 103 to the canister 101, diffused in the space 113, flow equally into the adsorption layers 151 and 152, and are adsorbed by the activated carbon 120. At this time, heat is generated in association with liquefaction of the fuel vapors. The generated heat is dissipated to the temperature control layer 109, so that increase in temperature of the activated carbon is suppressed. By operating the air pump P1, the air in the temperature control layer 109 of which temperature is increased by heat exchange is exhausted to the outside via the lead-out port 192. Since new air of low temperature is always supplied from the lead-in port 191 to the temperature control layer 109, the effect at cooling the activated carbon 120 is high, and a high adsorption performance can be obtained.

At the time of desorption of fuel vapors (engine operation), the three way valve V1 is opened to the path 194 side, and high-temperature air as a heating medium heated by the heat of the exhaust pipe 163 is introduced into the temperature control layer 109. On the other hand, the fuel vapors in the canister 101 are desorbed by the atmosphere introduced through the atmosphere port 118 by the intake pipe negative pressure and transmitted from the purge line 161 to the intake pipe 106. At this time, although the temperature of each of the adsorption layers 151 and 152 starts decreasing in association with vaporization of the fuel vapors, the adsorption layers 151 and 152 are heated by the high-temperature air flowing through the temperature control layer 109, and decrease in temperature is suppressed. The air in the temperature control layer 109 whose temperature is decreased by heat exchange is exhausted from the lead-out port 192 to the outside, and the high-temperature air is newly supplied from the lead-in port 191 to the temperature control layer 109. Thus, the effect at heating the activated carbon 120 is high, and high desorbing performance can be obtained.

As described above, by switching the medium to be introduced into the temperature control layer 109 at the times of adsorption and desorption and forcefully circulating the air in the temperature control layer 109 by using the air pump P1, a high temperature-control-effect can be obtained. As shown by a broken line in FIG. 24, the lead-through port 192 can be communicated with the atmosphere port 118 via a path 164. In this case, the high-temperature air exhausted from the temperature control layer 109 can be used as it is as a purge air, so that an effect at suppressing decrease in temperature at the time of desorption is high. In the embodiment, the outside air is used as a cooling medium and the high-temperature air heated by the heat of exhaust is used as a heating medium. Obviously, other gases can be used.

Figure 25:
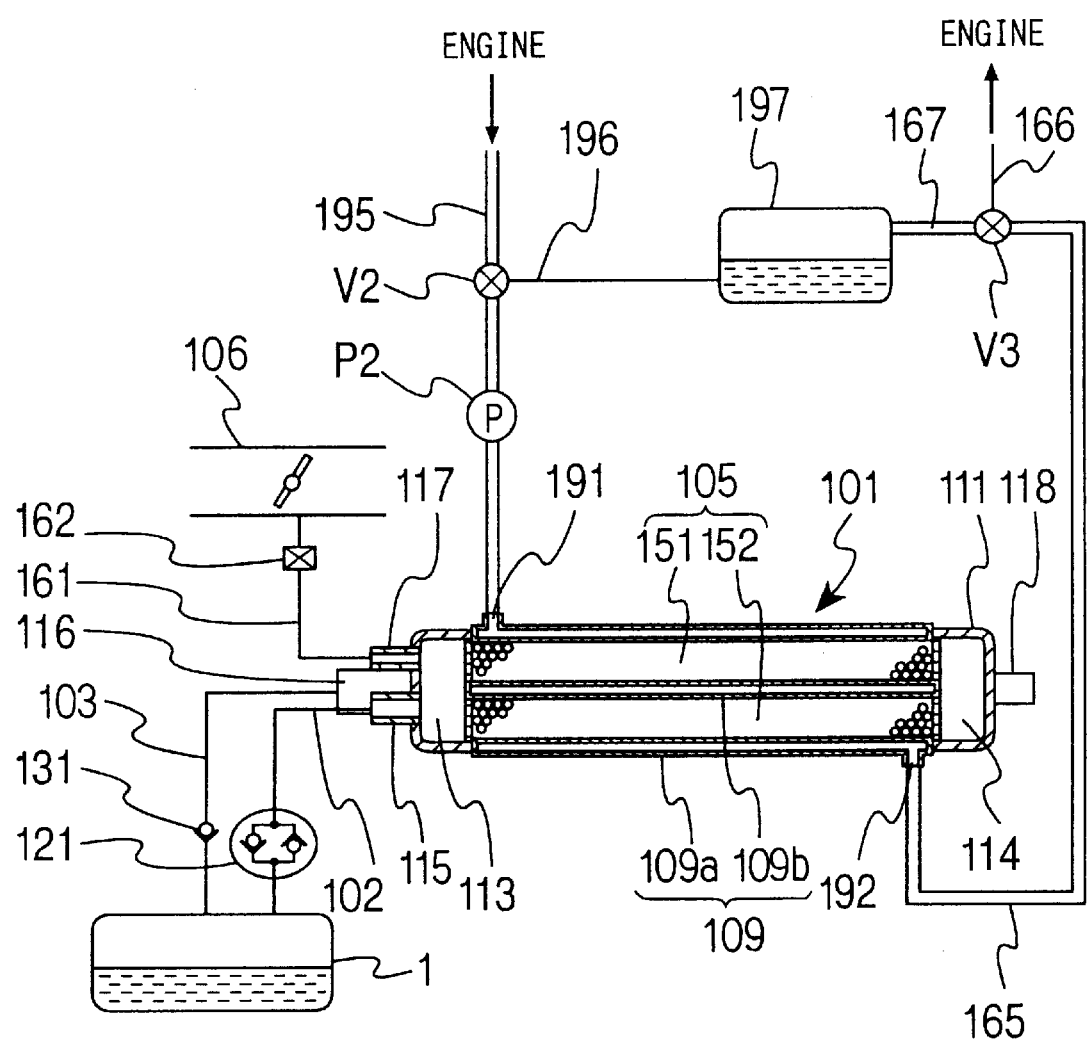
FIG. 25 is a configuration diagram showing the system of a fuel vapor control apparatus according to a seventh embodiment of the invention.

As a seventh embodiment shown in FIG. 25, a pump P2 may be connected to the lead-in port 191 and paths 195 and 196 may be connected to the pump P2 via a three way valve V2. The path 195 is connected to an engine cooling water pipe, and the path 196 is connected to a water tank 197. The water tank 197 is communicated with a three way valve V3 via a path 167, one end of the three way valve V3 is connected to a path 165 connected to the lead-out port 192, and the other end is connected to the engine cooling water pipe via a path 166.

In the configuration, at the time of adsorption such as engine stop, the three-way valve V2 is opened to the path 196 side to introduce low-temperature water in the water tank 197 as a cooling medium into the temperature control layer 109 by the pump P2. On the other hand, fuel vapors generated in the fuel tank 1 flow into the canister 101 and are adsorbed. At this time, the heat generated in association with liquefaction of the fuel vapors is dissipated to the low-temperature water flowing through the temperature control layer 109, so that increase in the temperature of the activated carbon is suppressed. The water in the temperature control layer 109 whose temperature is increased is exhausted from the lead-out port 192 by the pump P2 and returns to the water tank 197 via the path 165, three way valve V3, and path 167.

Since low-temperature water is always supplied from the lead-in port 191 to the temperature control layer 109, the effect at cooling the activated carbon 120 is high, and high adsorption performance can be obtained.

At the time of desorption in engine operation, the three way valve V2 is opened to the path 195 side, the high-temperature engine cooling water heated by the engine is introduced as a heating medium into the temperature control layer 109 by the pump P2. On the other hand, the fuel vapors are desorbed by atmosphere introduced from the atmosphere port 118 by the intake pipe negative pressure and transmitted to the intake pipe 106. At this time, the temperature of each of the adsorption layers 151 and 152 decreases in association with vaporization of the fuel vapors. However, the adsorption layers 151 and 152 are heated by the high-temperature water flowing in the temperature control layer 109, and decrease in temperature is suppressed. The water in the temperature control layer 109 whose temperature is decreased by heat exchange returns from the lead-out port 192 to the engine cooling water pipe via the path 165, three way valve V3, and path 166. Since the high-temperature water is always supplied from the lead-in port 191 to the temperature control layer 109, the effect at heating the activated carbon 120 is high, and high desorption performance can be obtained.

As described above, water can be also used as a cooling medium or heating medium. The medium to be introduced into the temperature control layer 109 is switched between the medium used at the time of adsorption and the medium used at the time of desorption. Further, by forcefully circulating the water in the temperature control layer 109 by using the pump P2, a high temperature control effect can be obtained. Except for the water, for example, a liquid such as oil may be used.

Figure 26:
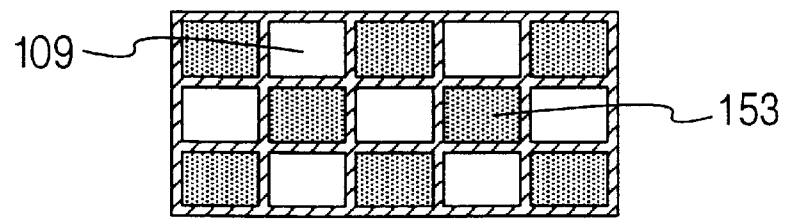
FIG. 26 is a cross section of a canister according to an eighth embodiment of the invention.
Figure 27:
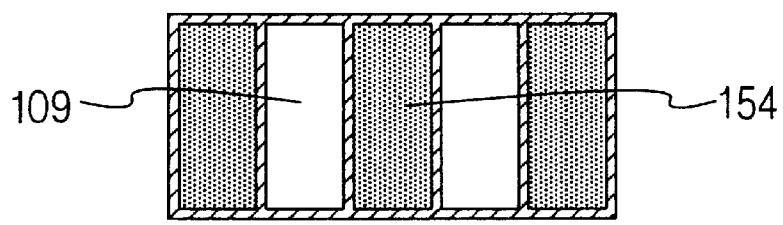
FIG. 27 is a cross section of a canister according to a ninth embodiment of the invention.

Although the fuel adsorption layer 105 is partitioned into the upper and lower two layers of the adsorption layers 151 and 152 in each of the foregoing embodiments (refer to FIG. 23), the shape and the number of the adsorption layers are not limited to the above. For example, as an eighth embodiment shown in FIG. 26, the fuel adsorption layer 105 may be partitioned into a number of parts in a lattice state, and the adsorption layer 153 and the temperature control layer 109 may be alternately disposed in the partitioned parts. As a ninth embodiment shown in FIG. 27, the adsorption layer 154 and the temperature control layer 109 may be alternately disposed in the lateral direction of the drawing. Each of FIGS. 26 and 27 is a cross section perpendicular to the flow direction of the fuel vapors of the fuel adsorption layer 105 (corresponding to FIG. 23), and the adsorption layers 153 and 154 are formed in parallel with the flow direction of the fuel vapors.

Figure 28:
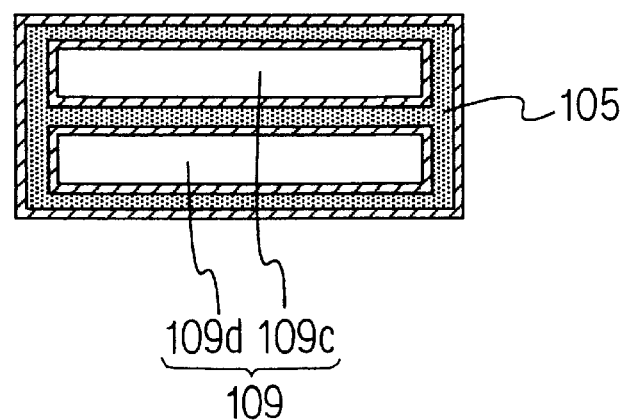
FIG. 28 is a cross section of a canister according to a tenth embodiment of the invention.

Further, as a tenth embodiment shown in FIG. 28, a configuration in which the temperature control layer 109 is embedded in the fuel adsorption layer 105, that is, the layout of the positions of the adsorption layers 151 and 152 and the temperature control layer 109 shown in FIG. 23 is reversed may be used. In FIG. 28, two temperature control layers 109*c* and 109*d* each having a flat rectangular cross section are disposed with a spacing in the fuel adsorption layer 105. The fuel adsorption layer 105 filled with the activated carbon so as to surround the temperature layers 9*c* and 9*d* is formed. In such a manner as well, a large contact area between the fuel adsorption layer 105 and temperature control layer 109 can be assured. By setting the fuel adsorption layer 105 to a proper thickness with which the temperature controlling effect is obtained, the temperature of the whole fuel adsorption layer 105 can be effectively controlled, and the adsorption and desorption performances can be improved.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A fuel vapor control apparatus for adsorbing and storing fuel vapors released from a fuel tank, and desorbing the adsorbed fuel vapors for an intake path of an internal combustion engine, comprising:

a canister having a casing and an adsorbent in the casing for providing a fuel adsorption layer for adsorbing the fuel vapors; and temperature control means for controlling temperature of the fuel adsorption layer, wherein the fuel adsorption layer and the temperature control means are arranged so that a temperature specified by the following relational expression (1) satisfies the following condition (2) in the whole area of the fuel adsorption layer;

$$T=-355Q \times X^2-815X+Q+298 \qquad (1)$$

Boiling point of fuel $\leq T <$ fire point of fuel (2)

where an amount of heat given to the adsorbent by the temperature control means is Q(W), a distance from the temperature control means to a farthest part which is the farthest of the fuel adsorption layer is X(m), and the temperature of the fuel adsorption layer is T(K).

2. The fuel vapor control apparatus according to claim 1, wherein when the boiling point of the fuel is 318K (45° C.) and the fire point of the fuel is 473K (200° C.), the amount Q of heat and the distance X are specified so that the temperature T satisfies the condition (2) in the whole area of the fuel adsorption layer.

3. A fuel vapor control apparatus for adsorbing and storing fuel vapors released from a fuel tank, and desorbing the adsorbed fuel vapors for an intake path of an internal combustion engine, comprising:

a canister having a casing and an adsorbent in the casing for providing a fuel adsorption layer for adsorbing the fuel vapors; and temperature control means provided integrally with a partition wall for partitioning the adsorption layer into a plurality of adsorption layers for controlling temperature of the fuel adsorption layer, the temperature control means being disposed in parallel with the flow of the fuel vapors, wherein the fuel adsorption layer and the temperature control means are arranged so that the fuel adsorption layer is entirely positioned within 25 mm from the temperature control means and so that a temperature specified by the following relational expression (1) satisfies the following condition (2) in the whole area of the fuel adsorption layer;

$$T=-355Q \times X^2-815X+Q+298 \qquad (1)$$

Boiling point of fuel $\leq T <$ fire point of fuel (2)

where an amount of heat given to the adsorbent by the temperature control means is Q(W), a distance from the temperature control means to a farthest part which is the farthest of the fuel adsorption layer is X(m), and the temperature of the fuel adsorption layer is T(K); and wherein the temperature control means is a temperature control layer comprising a pass provided in the partition wall or the casing wall, and a medium which flows in the pass to heat or cool the adsorbent.

4. The fuel vapor control apparatus according to claim 3, wherein the temperature control layer and the plurality of adsorbent layers are disposed alternately or in a lattice state.

5. A fuel vapor control apparatus for adsorbing and storing fuel vapors released from a fuel tank, and desorbing the adsorbed fuel vapors for an intake path of an internal combustion engine, comprising:

a canister having a casing and an adsorbent in the casing for providing a fuel adsorption layer for adsorbing the fuel vapors;

temperature control means for controlling temperature of the fuel adsorption layer; and control means for calculating a purge fuel amount on the basis of opening of a purge valve provided for the purge path and a detection result of an HC concentration sensor, and controlling the opening of the purge valve and operation of the temperature control means so that the purge fuel amount lies in a predetermined range.

6. The fuel vapor control apparatus according to claim 5, wherein the temperature control means is heating means for heating the adsorbent, and the control means stops operation of the temperature control means when an amount of remaining fuel in the fuel tank becomes equal to or smaller than a predetermined value.

7. The fuel vapor control apparatus according to claim 5, wherein the control means stops operation of the temperature control means when the HC concentration detected by the HC concentration sensor or a fuel tank internal pressure becomes equal to or lower than a predetermined value.

8. A fuel vapor control apparatus for adsorbing and storing fuel vapors released from a fuel tank, and desorbing the adsorbed fuel vapors for an intake path of an internal combustion engine, comprising:

a canister having a casing and an adsorbent in the casing for providing a fuel adsorption layer for adsorbing the fuel vapors; and temperature control means for controlling temperature of the fuel adsorption layer, the temperature control means being disposed in parallel with the flow of the fuel vapors, wherein the fuel adsorption layer and the temperature control means are arranged so that the fuel adsorption layer is entirely positioned within 25 mm from the temperature control means and so that a temperature specified by the following relational expression (1) satisfies the following condition (2) in the whole area of the fuel adsorption layer;

$$T=-355Q \times X^2-815X+Q+298 \qquad (1)$$

Boiling point of fuel $\leq T <$ fire point of fuel (2)

where an amount of heat given to the adsorbent by the temperature control means is Q(W), a distance from the temperature control means to a farthest part which is the farthest of the fuel adsorption layer is X(m), and the temperature of the fuel adsorption layer is T(K);

means for pressurizing a closed space by heating the temperature control means, the closed space being formed in a path of fuel vapors extending from the fuel tank to the intake path via the canister when a purge valve provided for the purge path is closed; and determining a leak in the closed space in accordance with whether or not a pressure in the closed space detected by pressure detecting means reaches a predetermined pressure within a predetermined time.

9. The fuel vapor control apparatus according to claim 8, wherein the pressurizing means pressurizes the closed space to a predetermined pressure by being heated by the temperature control means, after that, interrupting the heating, and the determining means determines the leak in the closed space from a pressure drop state of the closed space detected by the pressure detecting means.

10. A fuel vapor control apparatus for adsorbing and storing fuel vapors released from a fuel tank, and desorbing the adsorbed fuel vapors for an intake path of an internal combustion engine, comprising:

a canister having a casing and an adsorbent in the casing for providing a fuel adsorption layer for adsorbing the fuel vapors; and temperature control means for controlling temperature of the fuel adsorption layer, where a cross section perpendicular to the flow of the fuel vapors of the fuel adsorption layer is formed in a flat, almost rectangular shape, and the temperature control means is disposed along a casing wall that is in contact with a long side of the rectangular shape;

means for pressurizing a closed space by heating the temperature control means, the closed space being formed in a path of fuel vapors extending from the fuel tank to the intake path via the canister when a purge valve provided for the purge path is closed; and determining a leak in the closed space in accordance with whether or not a pressure in the closed space detected by pressure detecting means reaches a predetermined pressure within a predetermined time.

11. The fuel vapor control apparatus according to claim 10, wherein the pressurizing means pressurizes the closed space to a predetermined pressure by being heated by the temperature control means, after that, interrupting the heating, and the determining means determines the leak in the closed space from a pressure drop state of the closed space detected by the pressure detecting means.

12. The fuel vapor control apparatus according to claim 5, further comprising means for pressurizing a closed space by heating the temperature control means, the closed space being formed in a path of fuel vapors extending from the fuel tank to the intake path via the canister when a purge valve provided for the purge path is closed; and determining a leak in the closed space in accordance with whether or not a pressure in the closed space detected by pressure detecting means reaches a predetermined pressure within a predetermined time.

13. The fuel vapor control apparatus according to claim 12, wherein the pressurizing means pressurizes the closed space to a predetermined pressure by being heated by the temperature control means, after that, interrupting the heating, and the determining means determines the leak in the closed space from a pressure drop state of the closed space detected by the pressure detecting means.

* * * * *